No. 698,617. Patented Apr. 29, 1902.
F. E. ALLEN.
DRIER.
(Application filed Feb. 8, 1901.)
(No Model.) 21 Sheets—Sheet 4.

No. 698,617. Patented Apr. 29, 1902.
F. E. ALLEN.
DRIER.
Application filed Feb. 8, 1901.
(No Model.) 21 Sheets—Sheet 6.

WITNESSES
INVENTOR

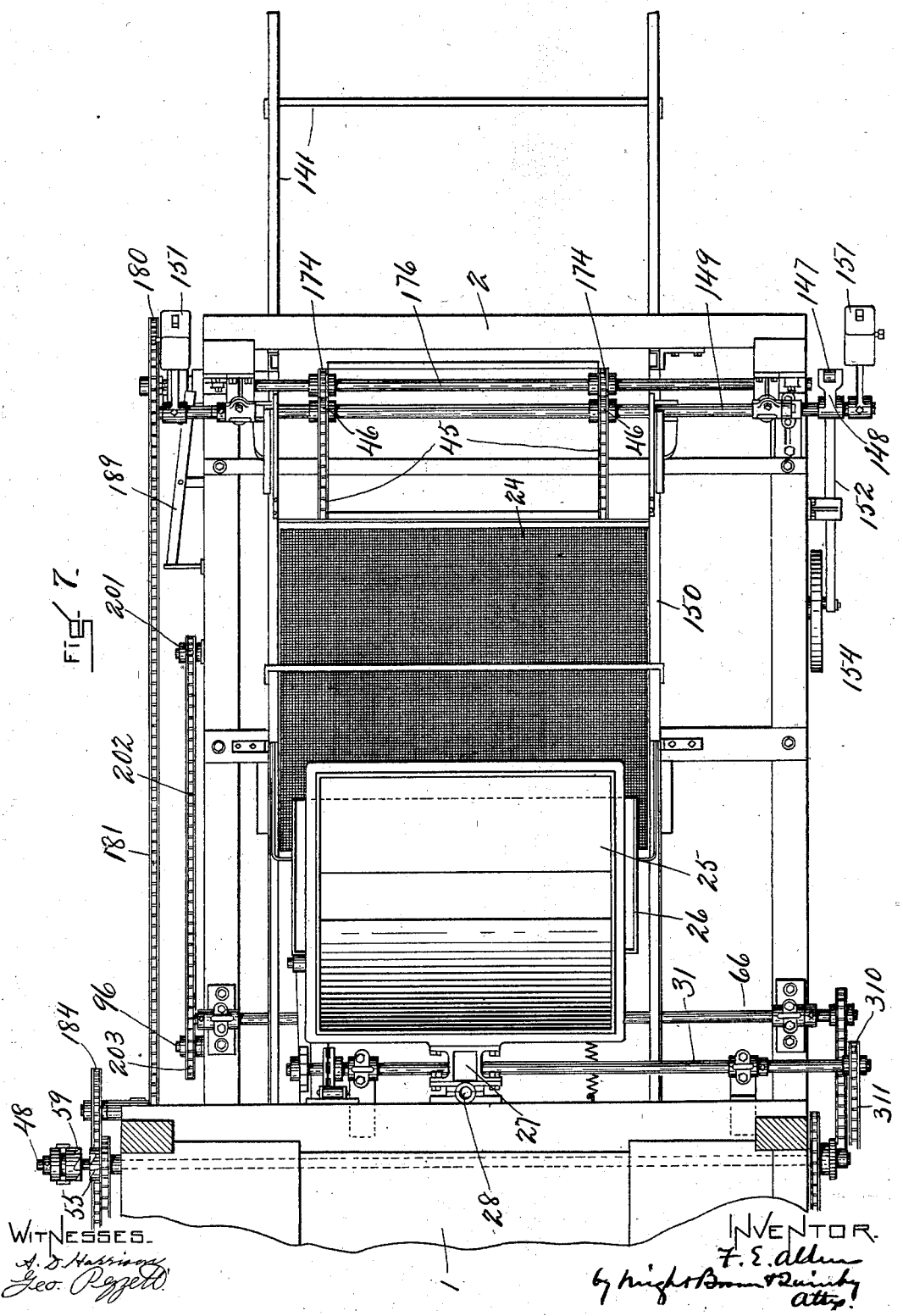

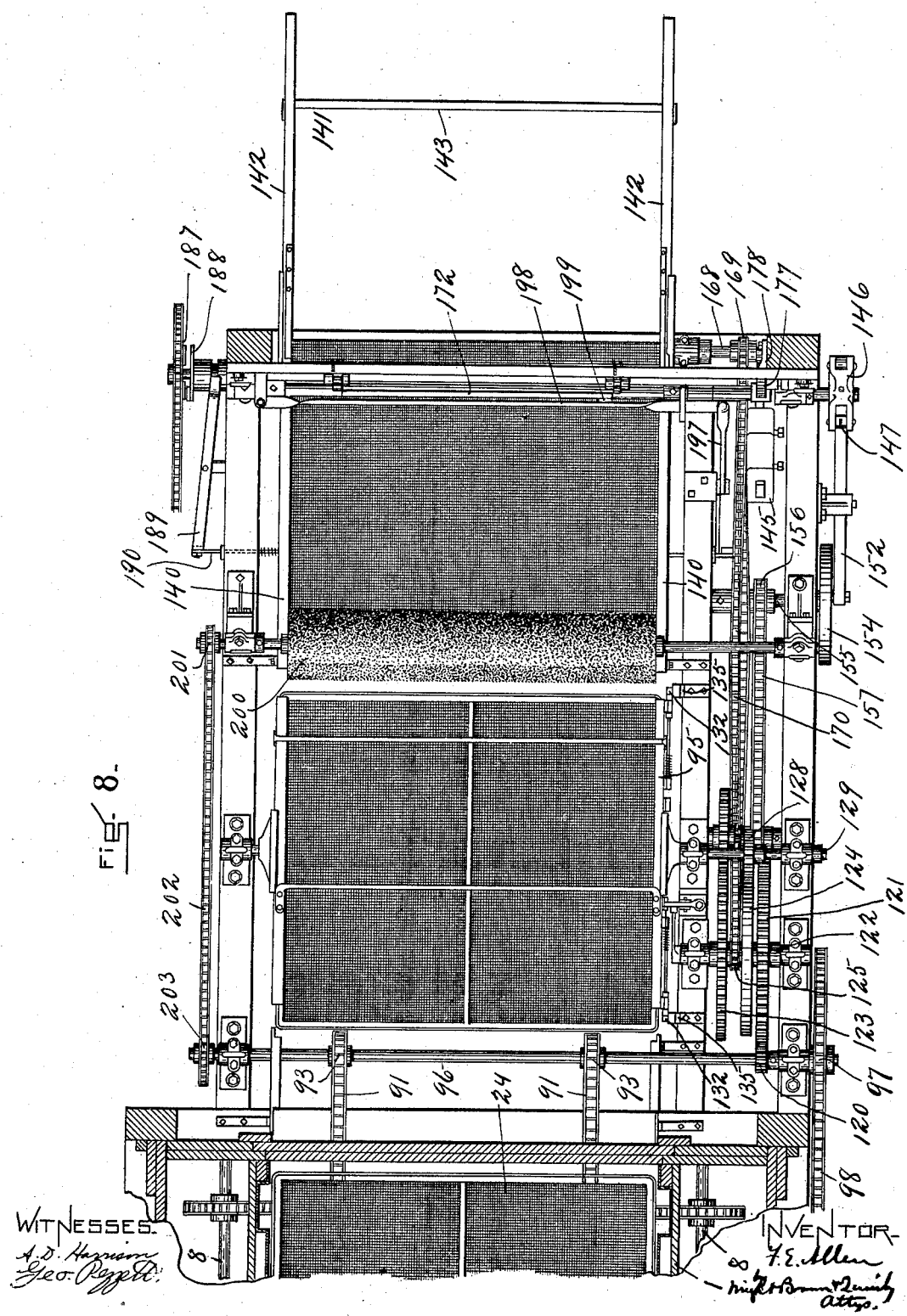

No. 698,617. Patented Apr. 29, 1902.
F. E. ALLEN.
DRIER.
Application filed Feb. 8, 1901.
(No Model.) 21 Sheets—Sheet 9.
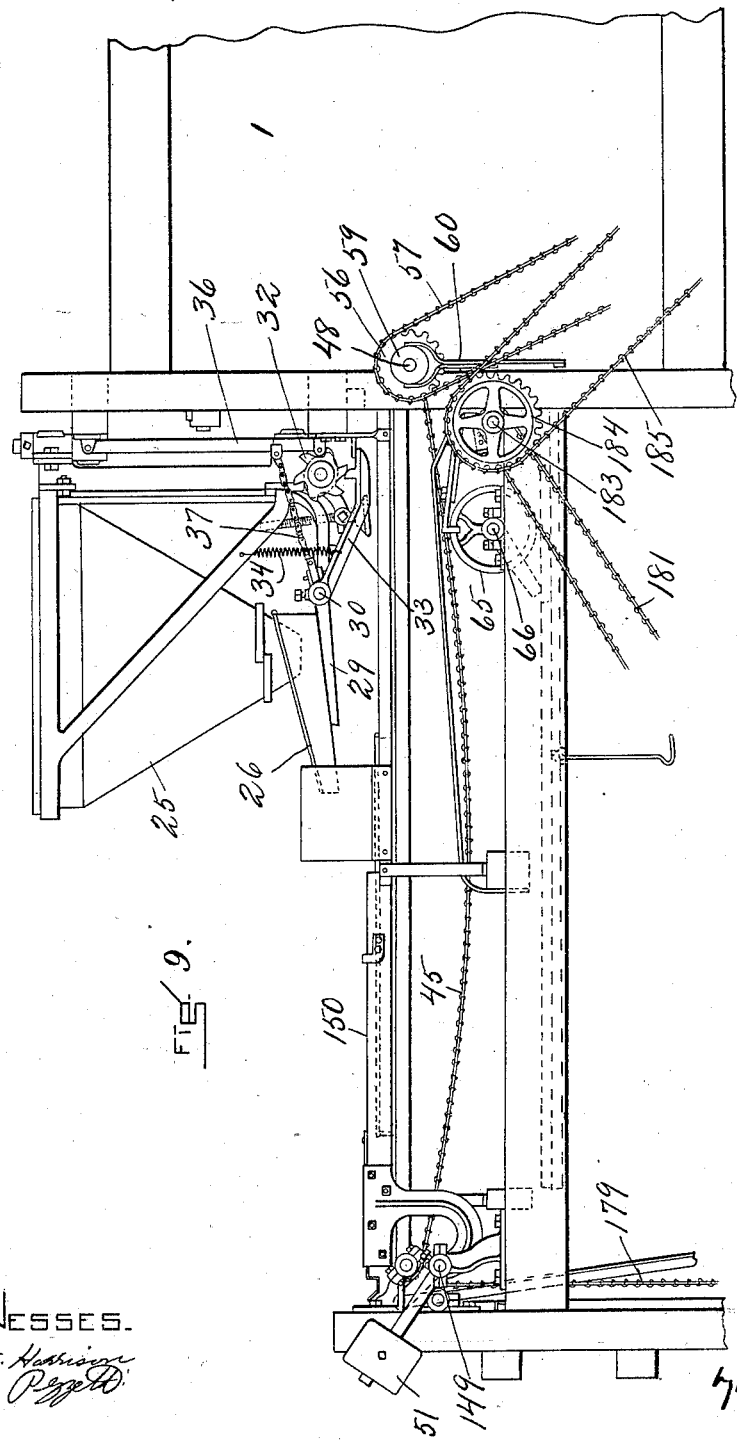

No. 698,617. Patented Apr. 29, 1902.
F. E. ALLEN.
DRIER.
(Application filed Feb. 8, 1901.)
(No Model.) 21 Sheets—Sheet 10.
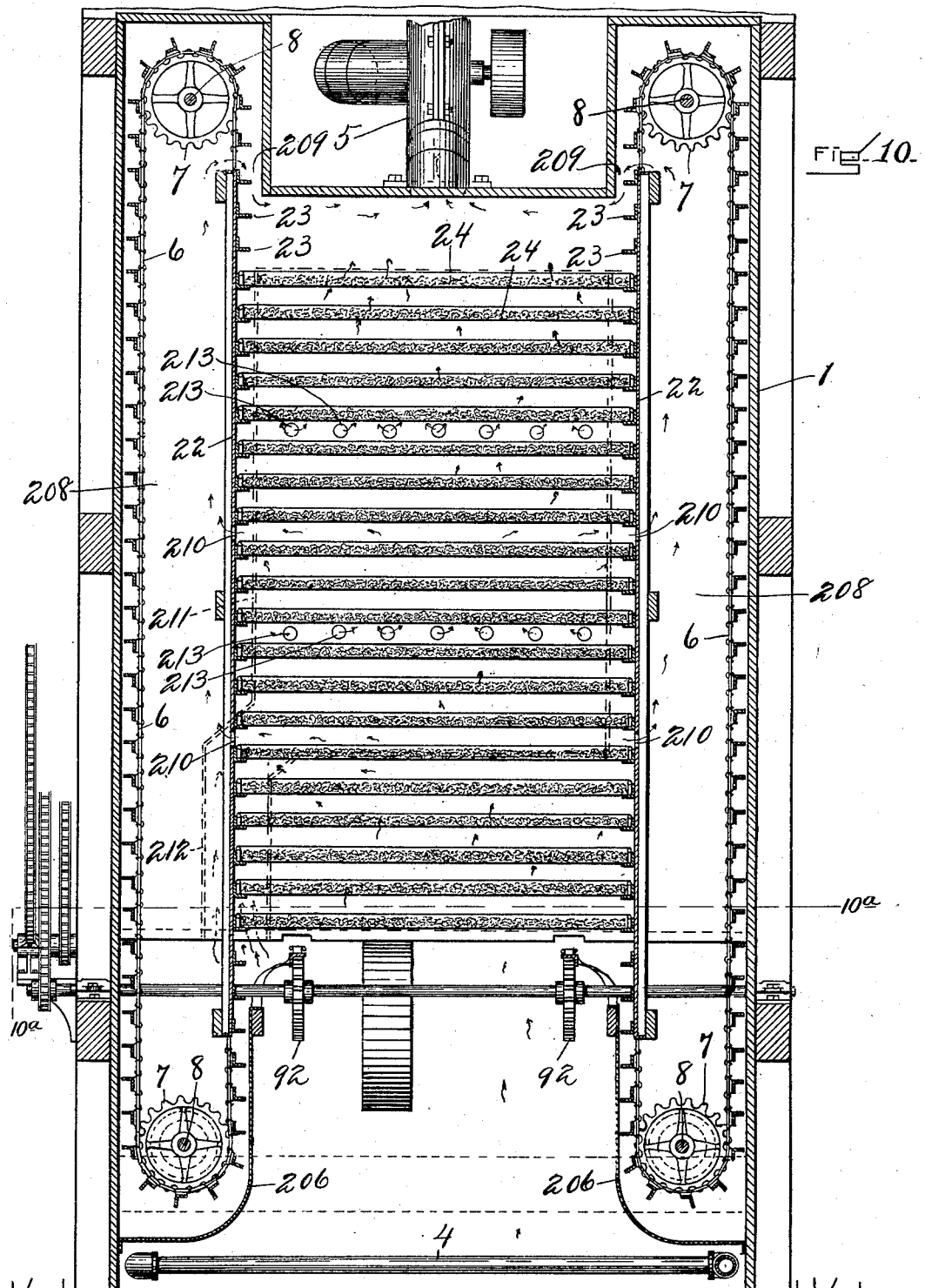
WITNESSES. INVENTOR.

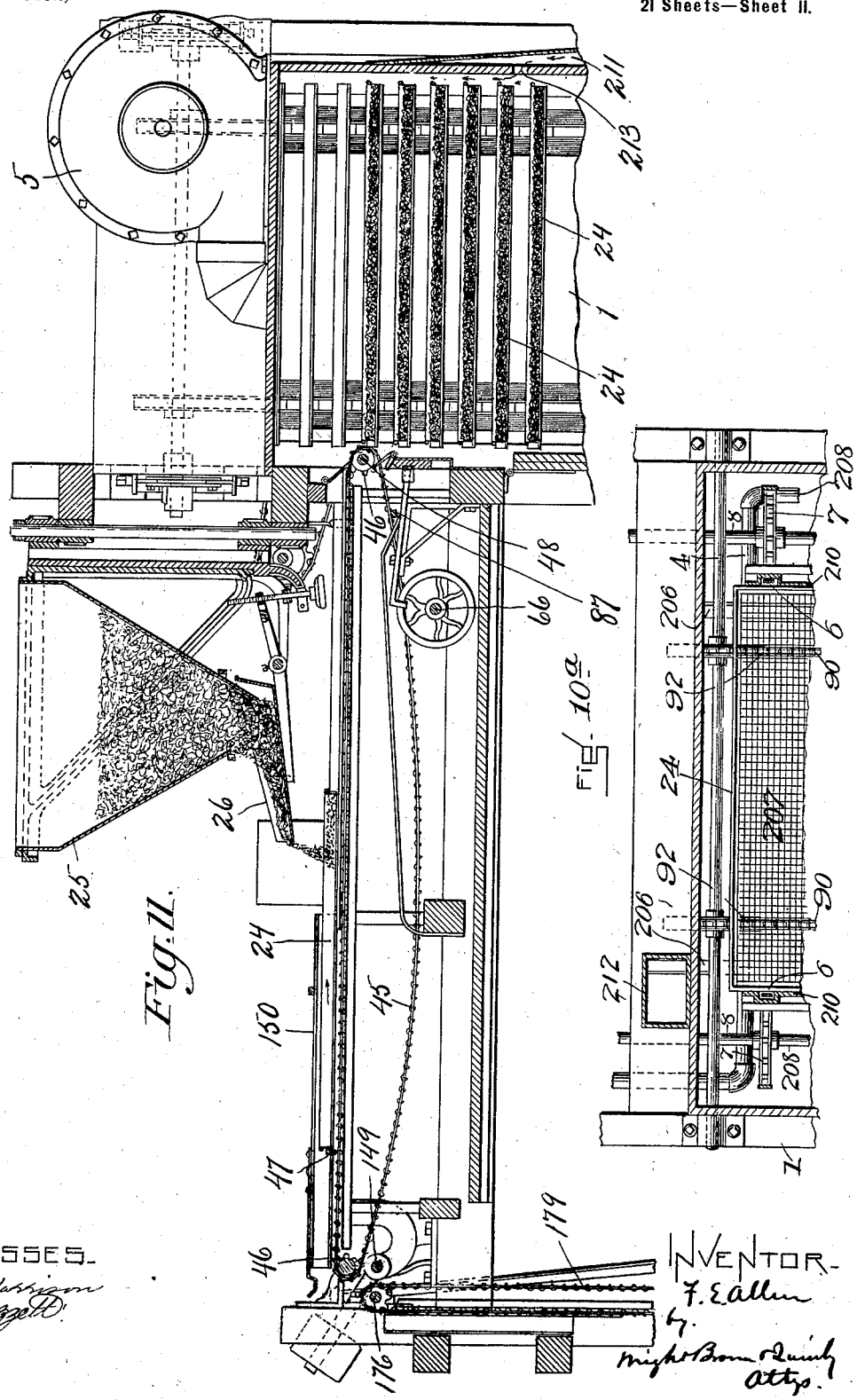

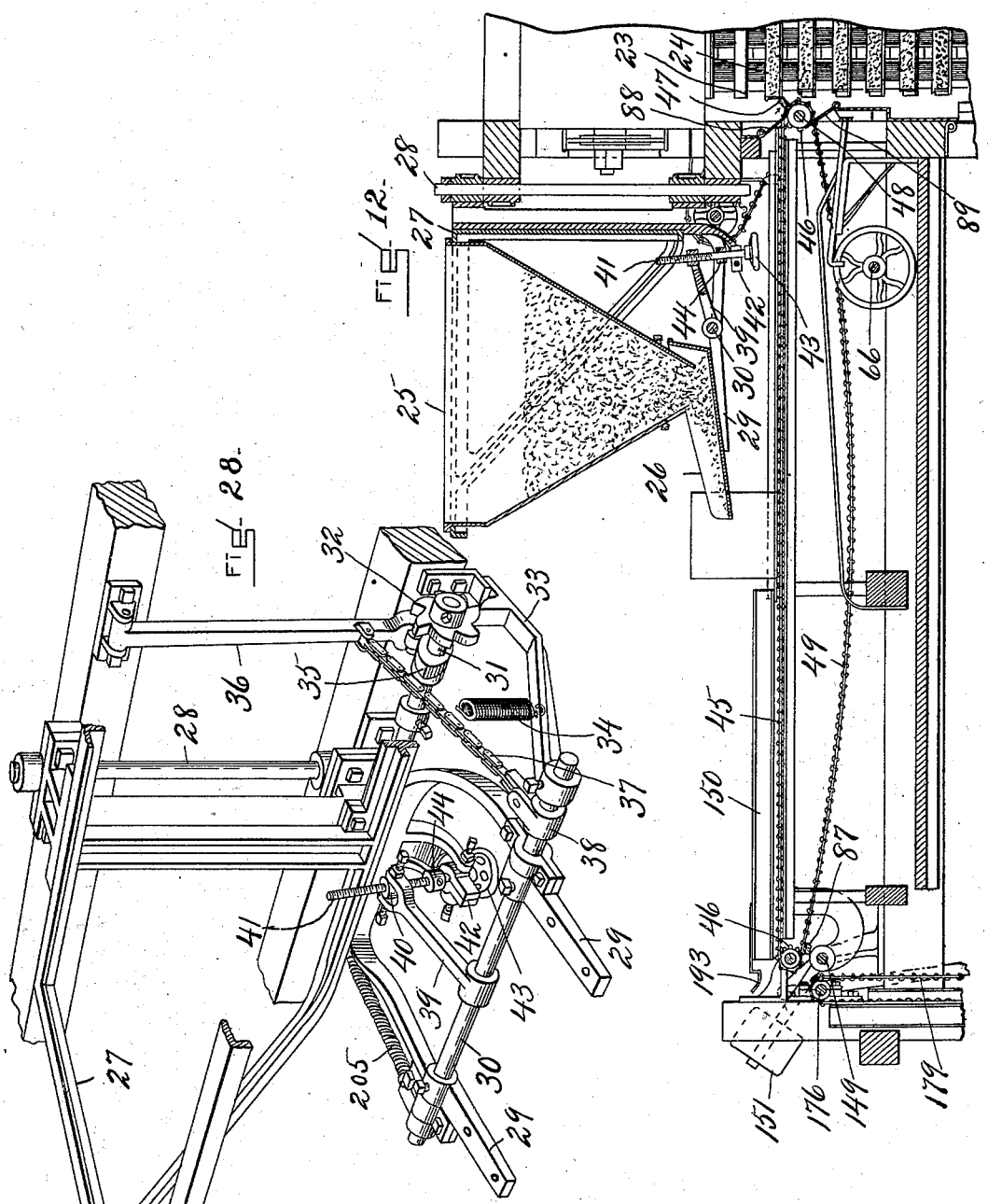

No. 698,617. Patented Apr. 29, 1902.
F. E. ALLEN.
DRIER.
(Application filed Feb. 8, 1901.)
(No Model.) 21 Sheets—Sheet 13.
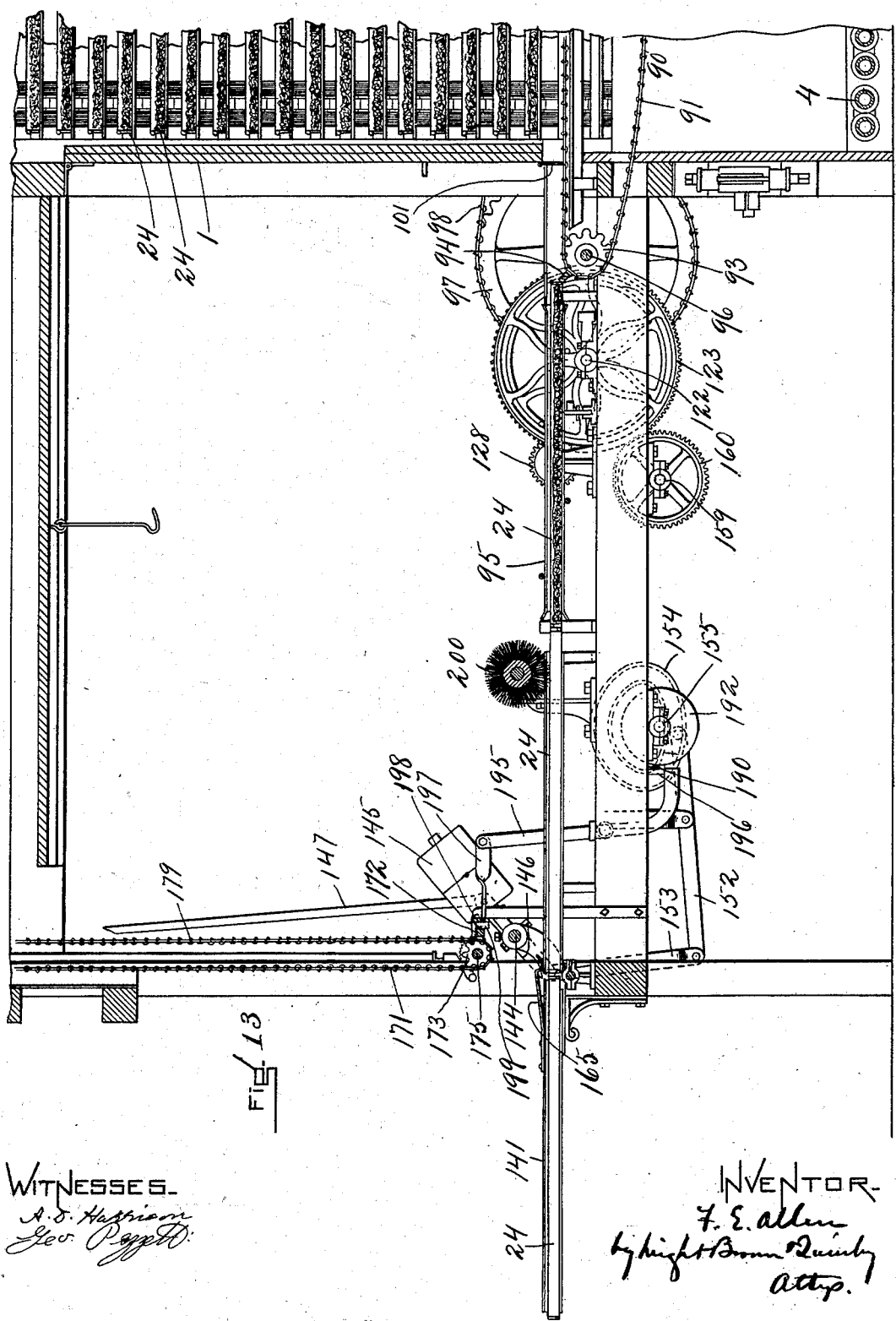

No. 698,617. Patented Apr. 29, 1902.
F. E. ALLEN.
DRIER.
(Application filed Feb. 8, 1901.)
(No Model.) 21 Sheets—Sheet 14.
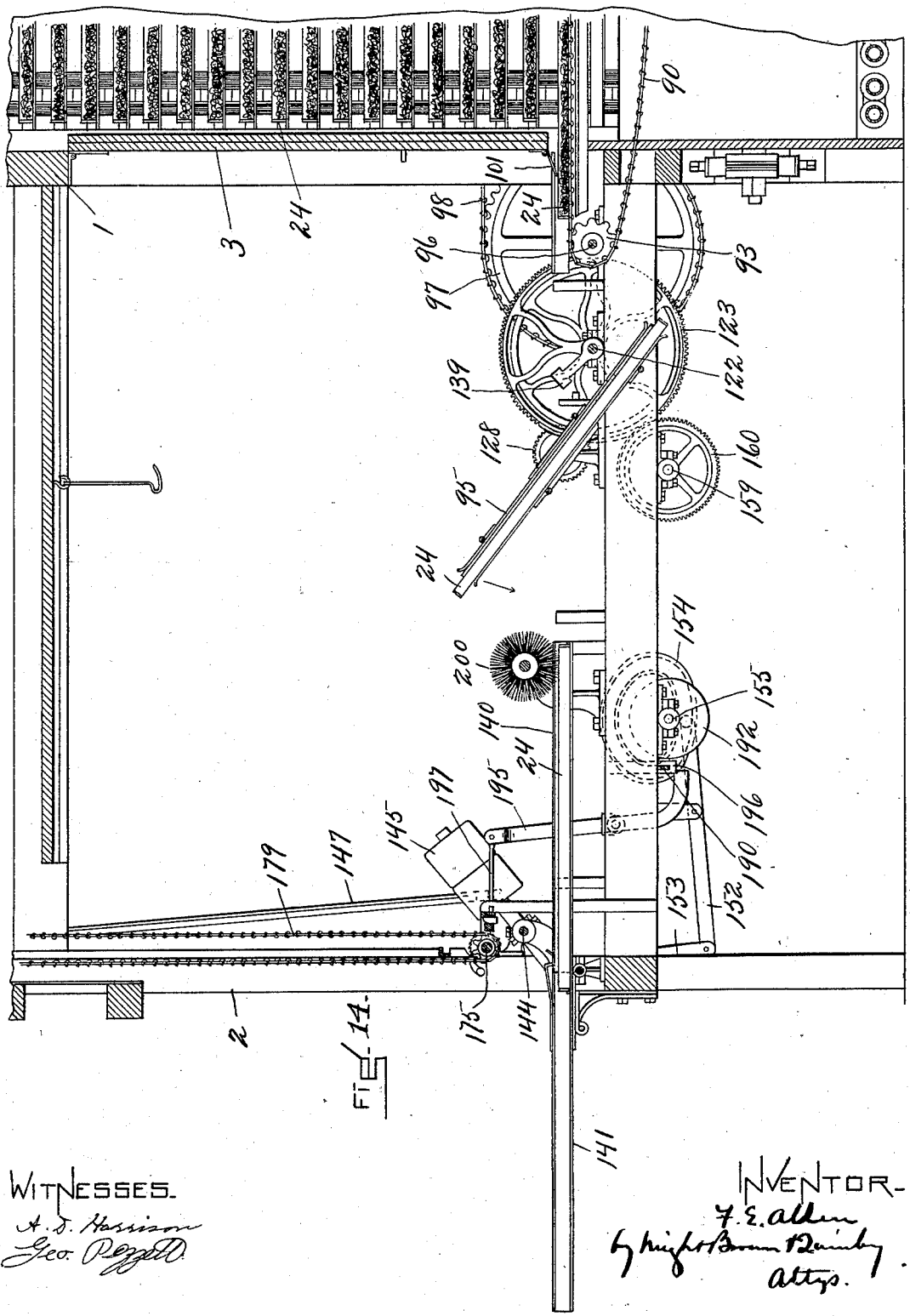
WITNESSES.
INVENTOR.

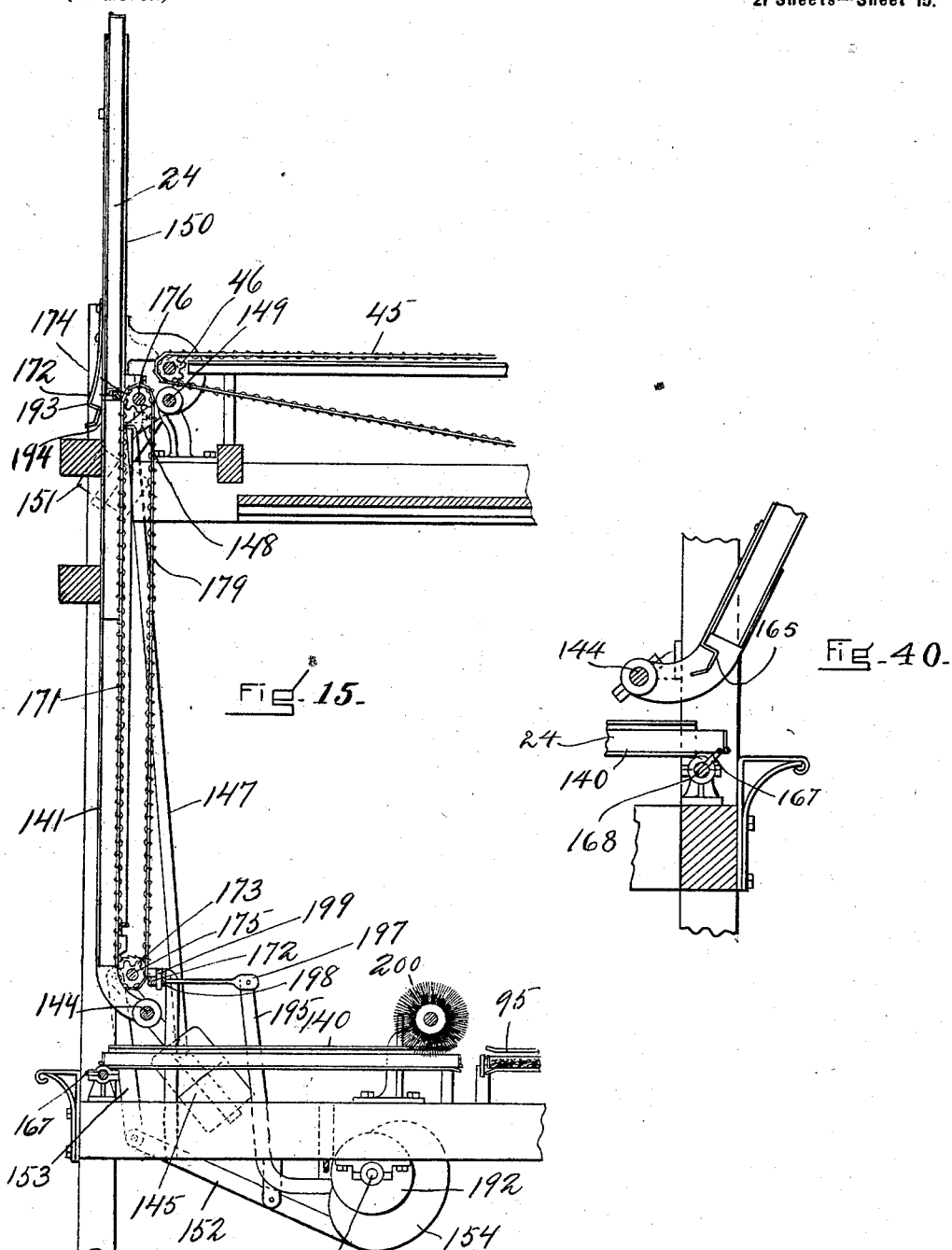

No. 698,617. Patented Apr. 29, 1902.
F. E. ALLEN.
DRIER.
Application filed Feb. 8, 1901.)
(No Model.) 21 Sheets—Sheet 16.
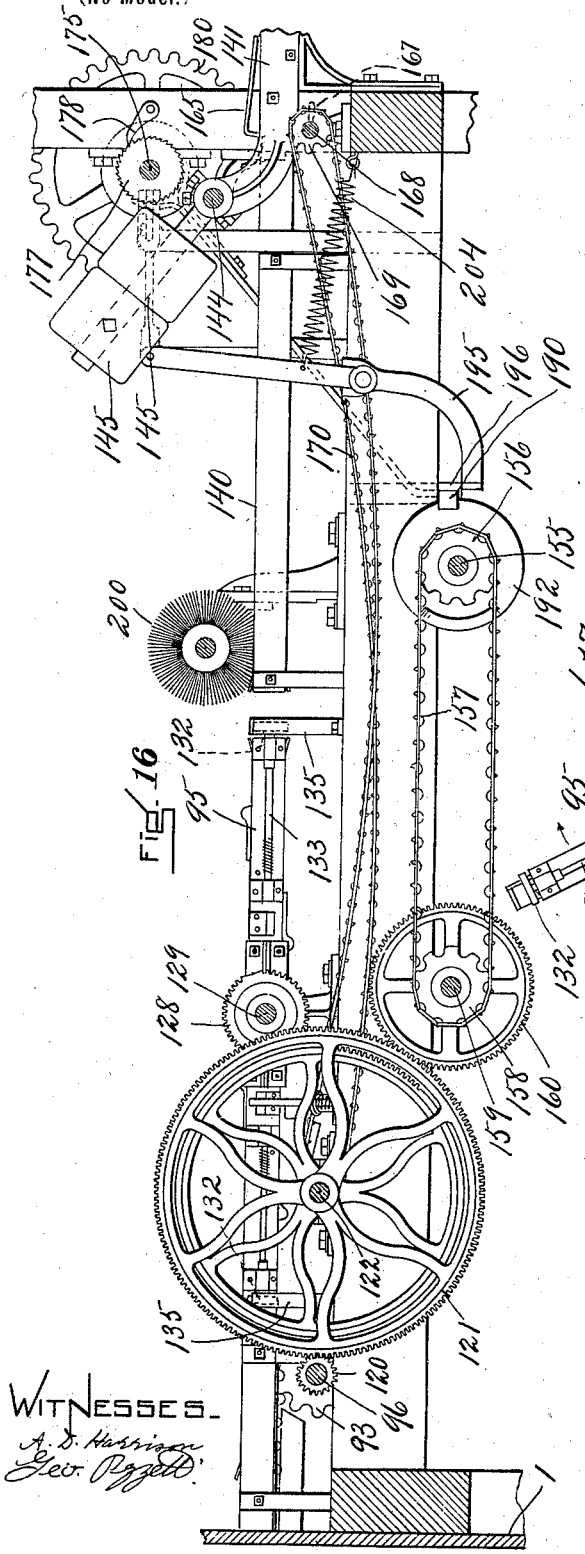
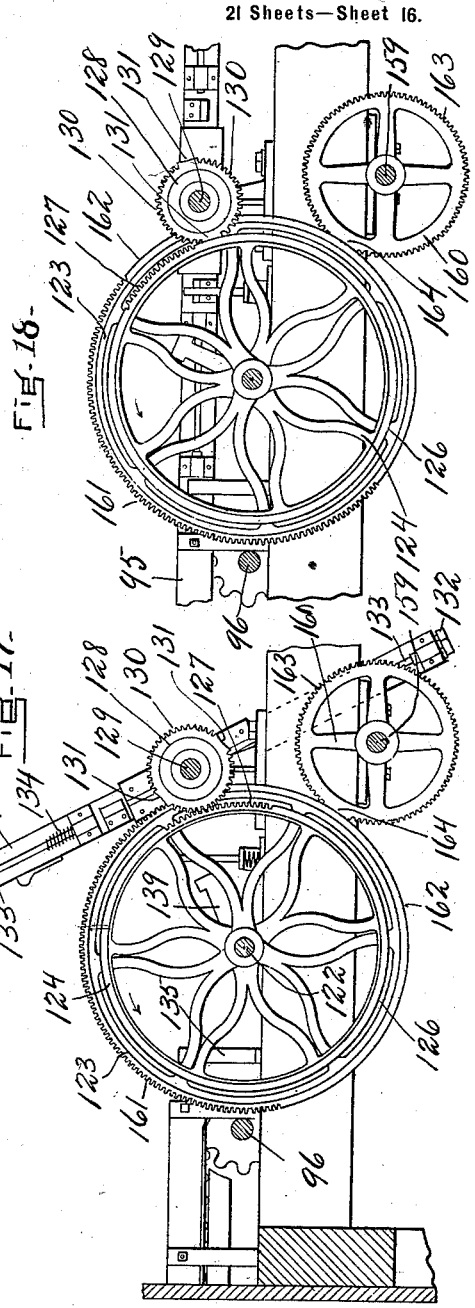
Witnesses_
Inventor-
F. E. Allen

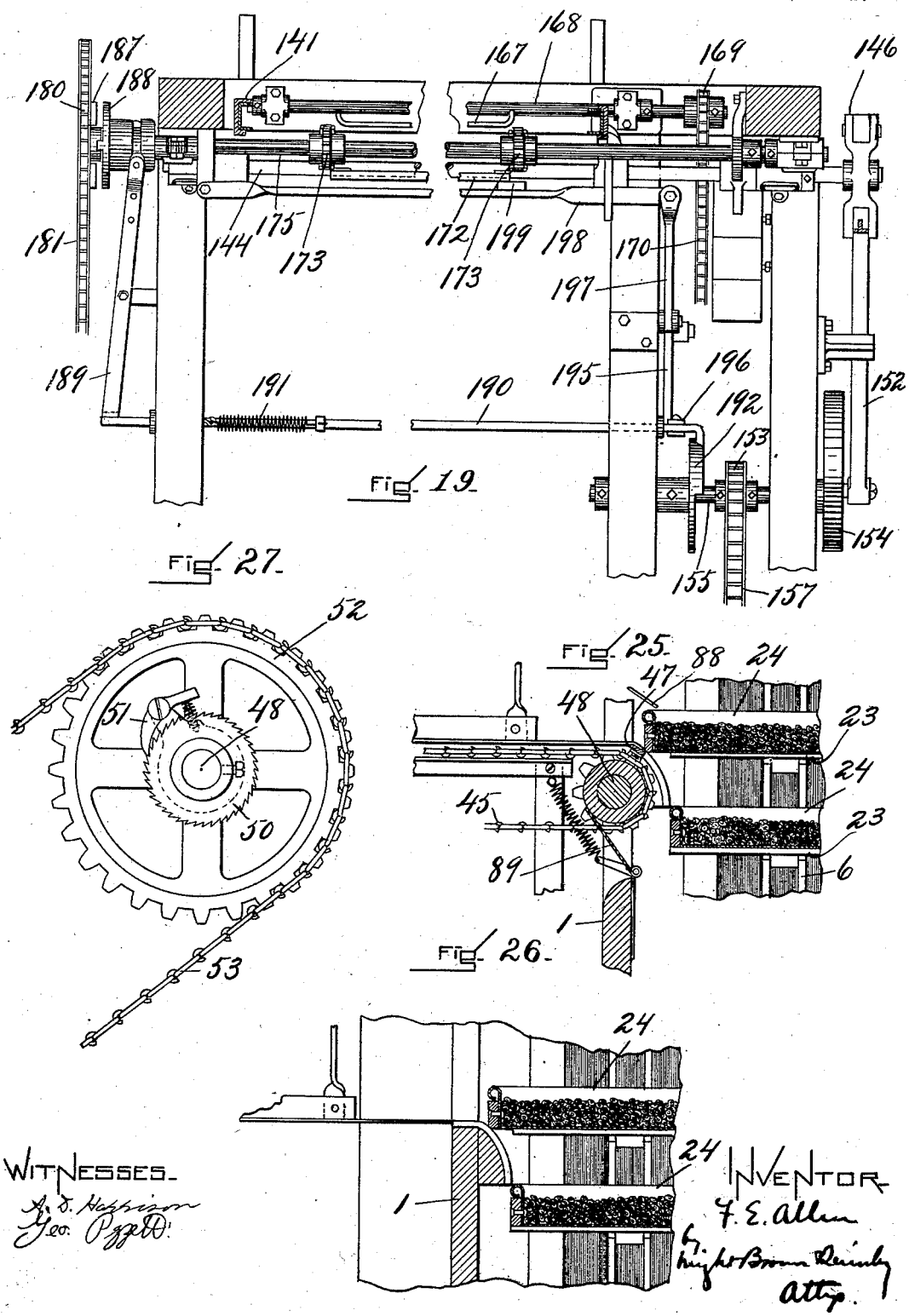

No. 698,617. Patented Apr. 29, 1902.
F. E. ALLEN.
DRIER.
(Application filed Feb. 8, 1901.)
(No Model.) 21 Sheets—Sheet 18.
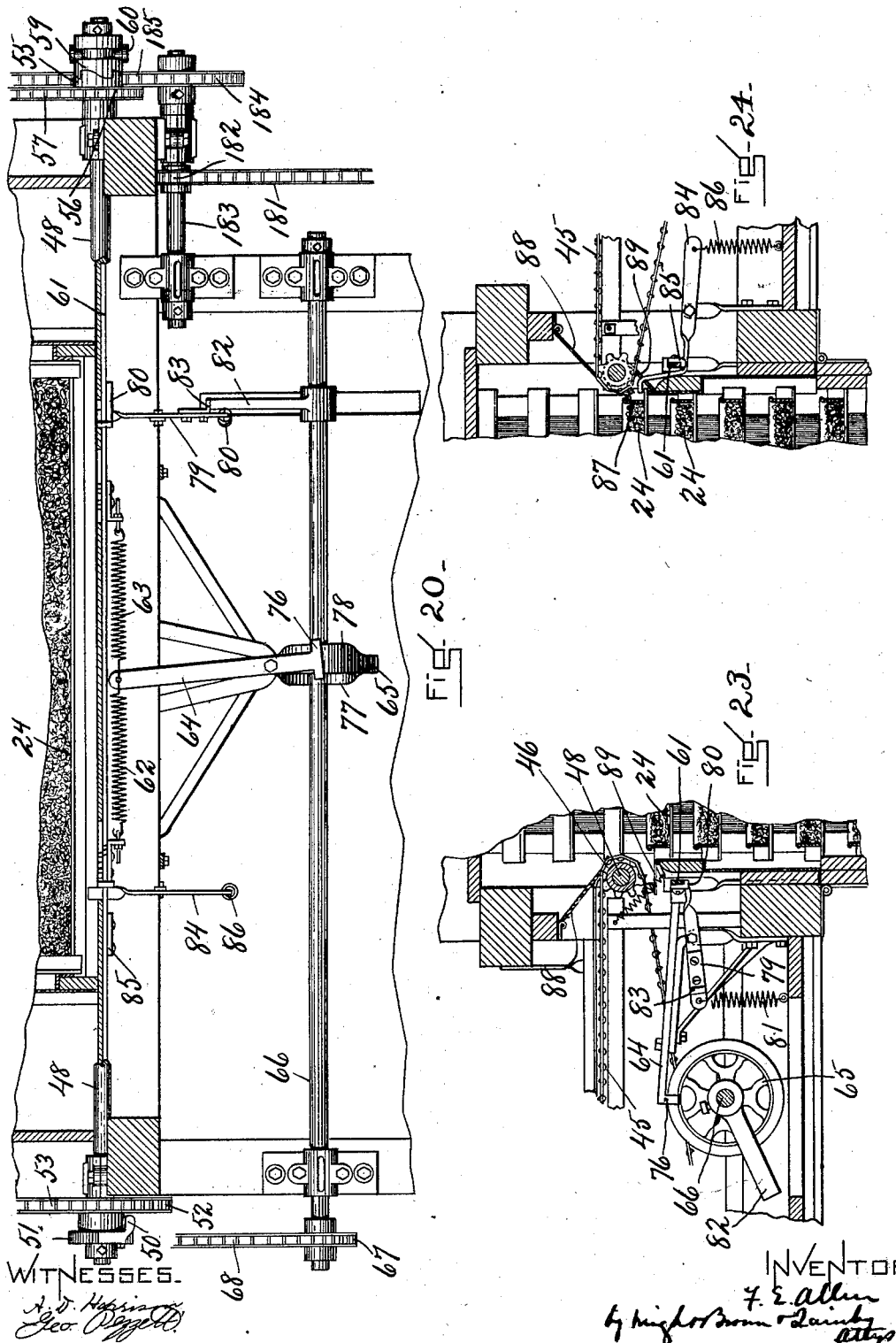

No. 698,617.  
F. E. ALLEN.  
DRIER.  
(Application filed Feb. 8, 1901.)  
(No Model.)  
Patented Apr. 29, 1902.  
21 Sheets—Sheet 19.
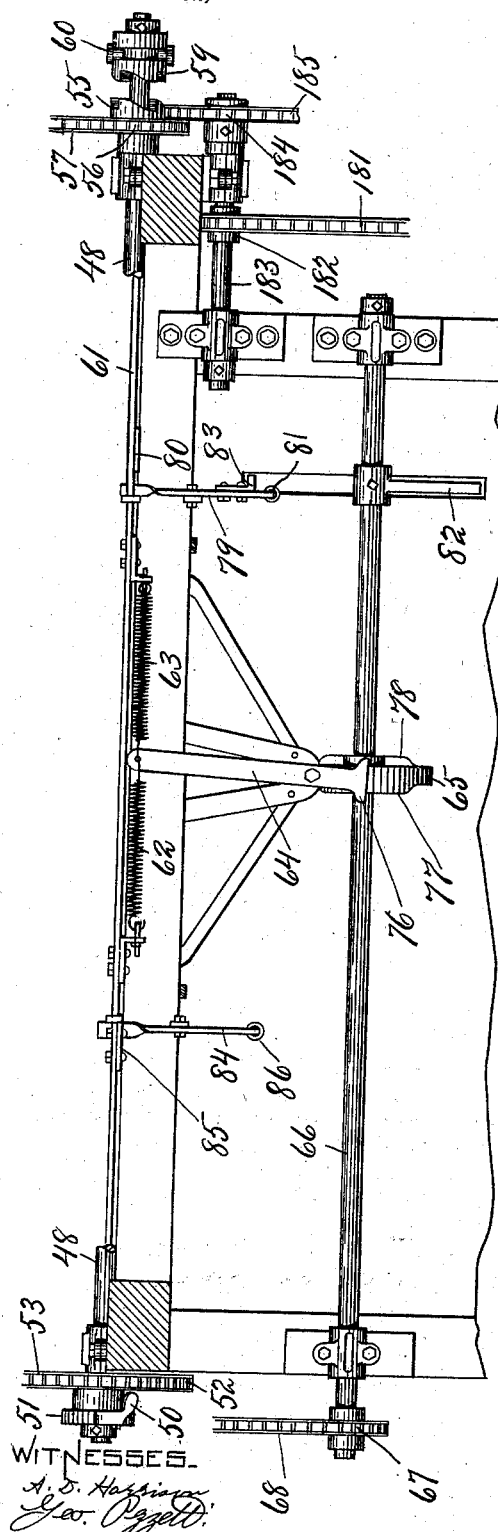

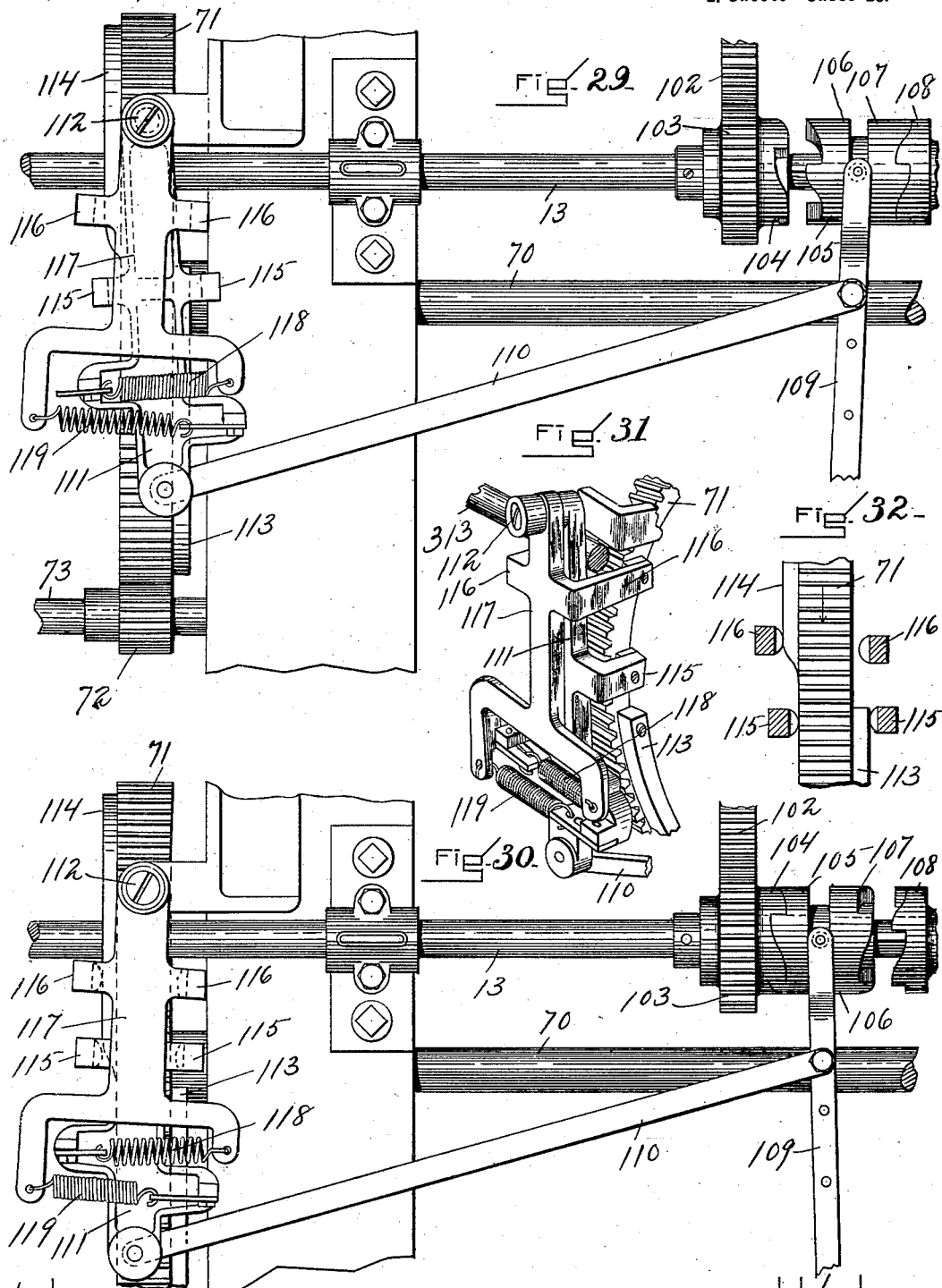

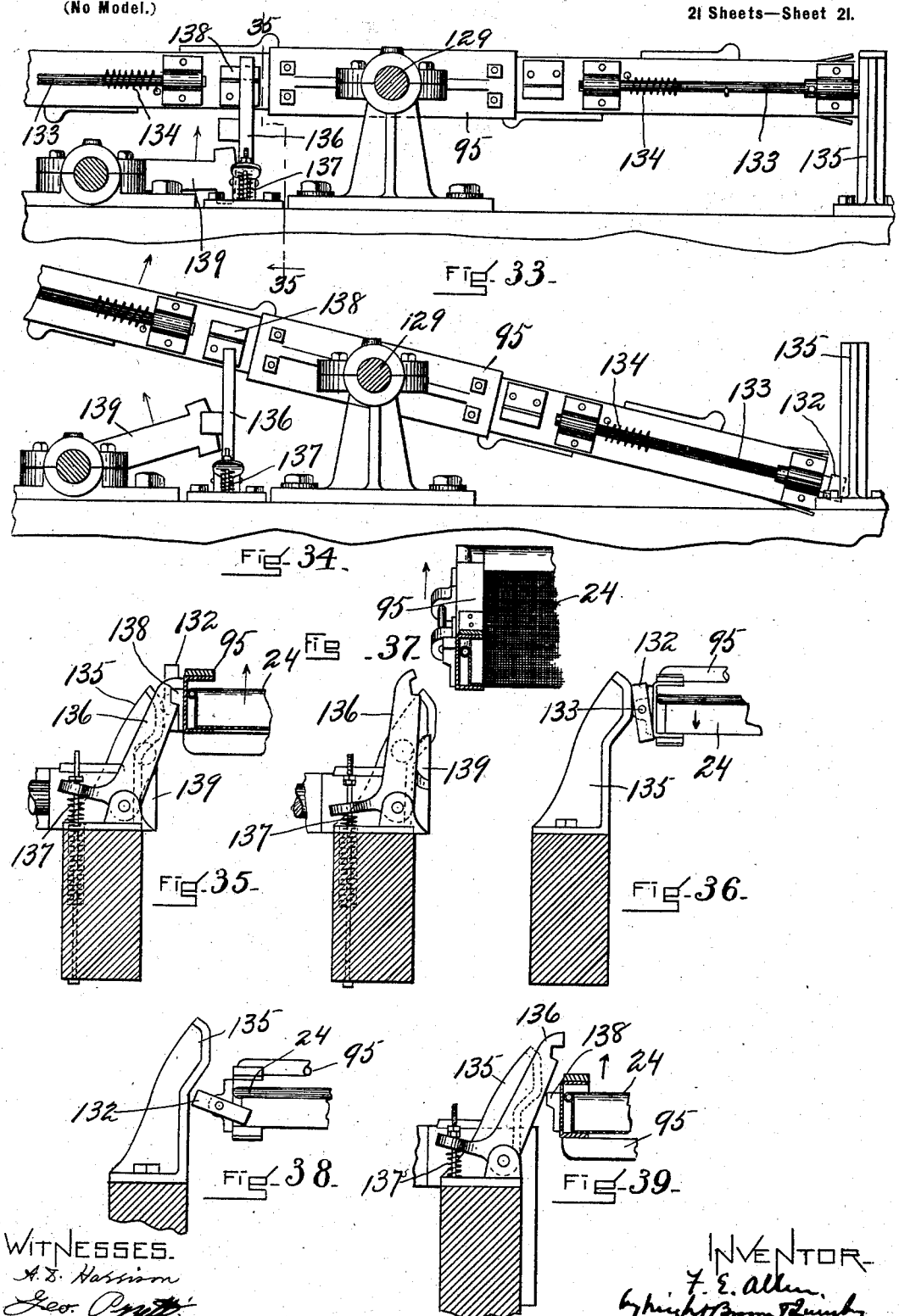

UNITED STATES PATENT OFFICE.

FREDERICK E. ALLEN, OF BOSTON, MASSACHUSETTS.

DRIER.

SPECIFICATION forming part of Letters Patent No. 698,617, dated April 29, 1902.

Application filed February 8, 1901. Serial No. 46,529. (No model.)

*To all whom it may concern:*

Be it known that I, FREDERICK E. ALLEN, of Boston, in the county of Suffolk and State of Massachusetts, have invented certain new and useful Improvements in Driers, of which the following is a specification.

This invention relates to apparatus for drying or evaporating different materials, such as vegetables, fruit, grain, &c.; and it consists in an improved automatic machine for this purpose, substantially as hereinafter set forth.

Figure 1:
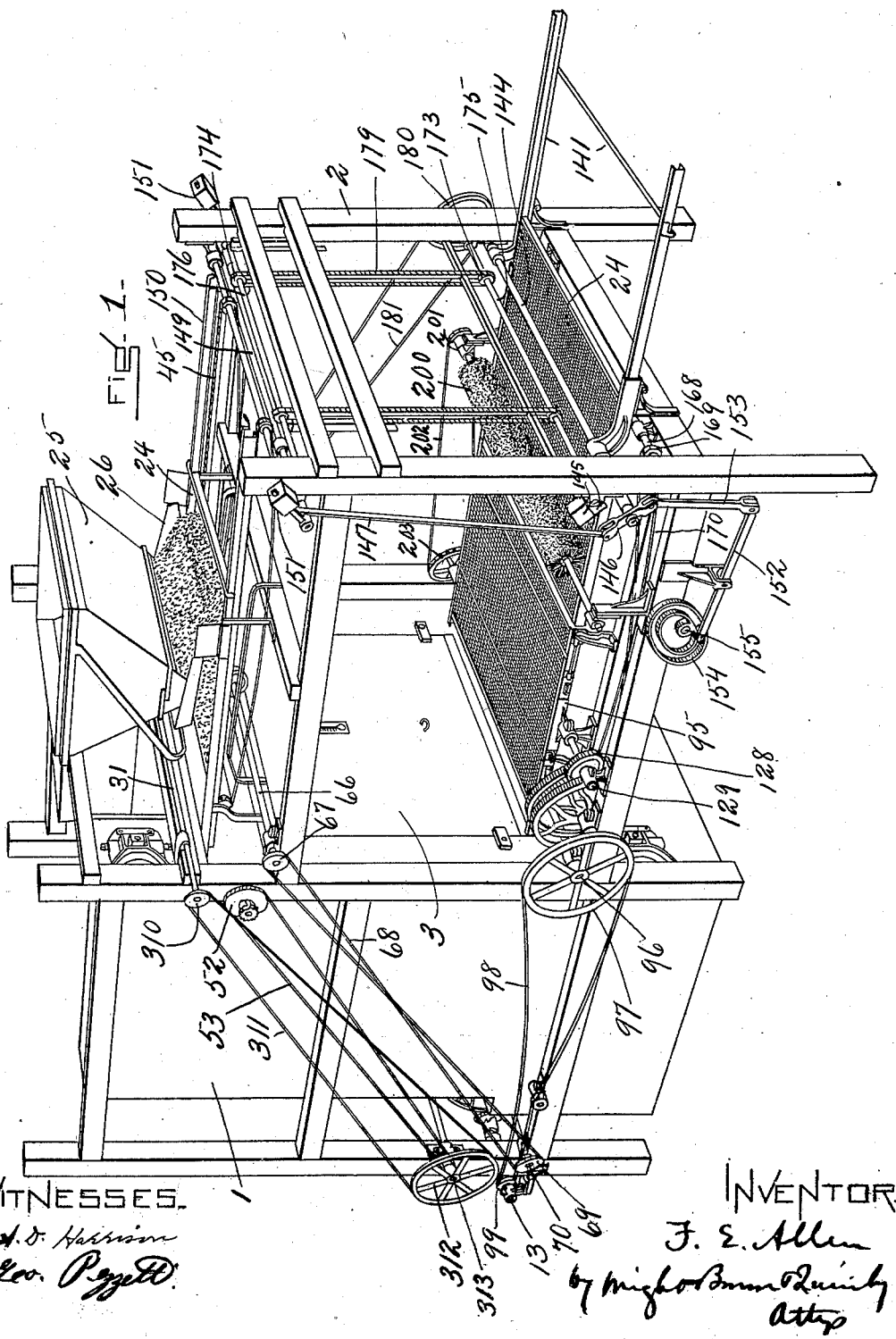
Figure 2:
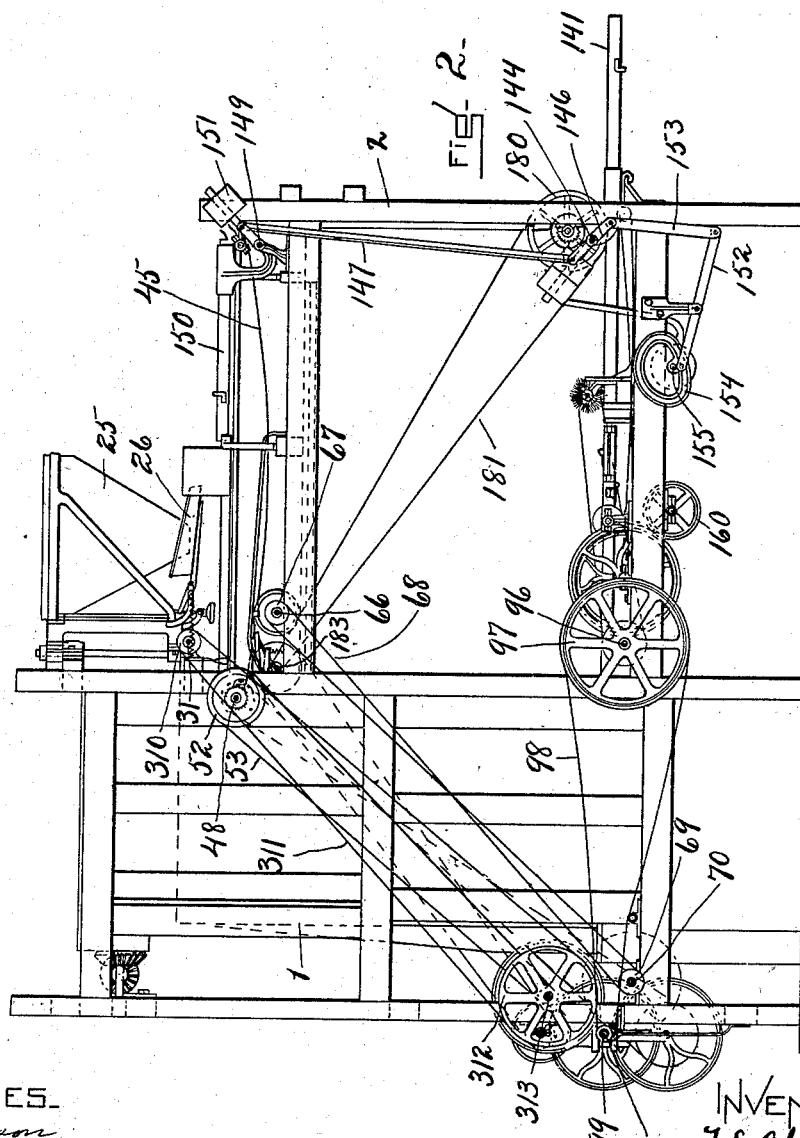
Figure 3:
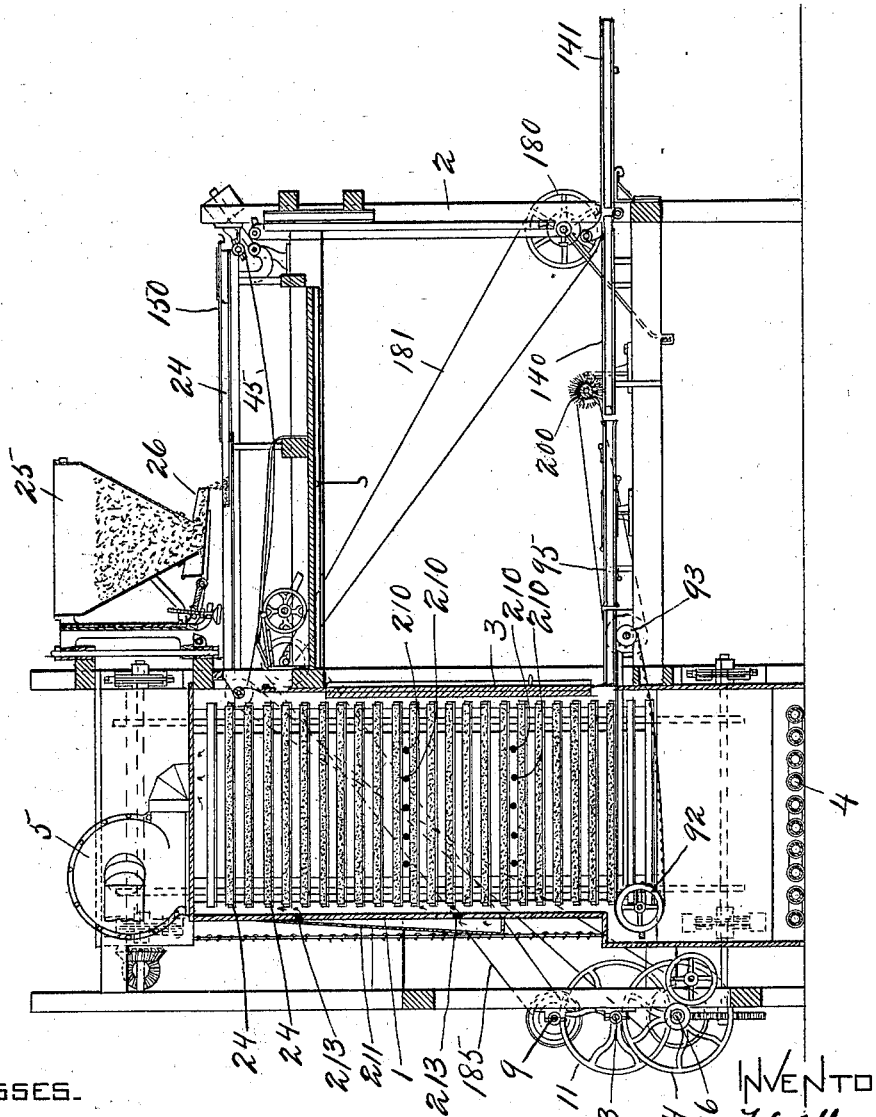
Figure 4:
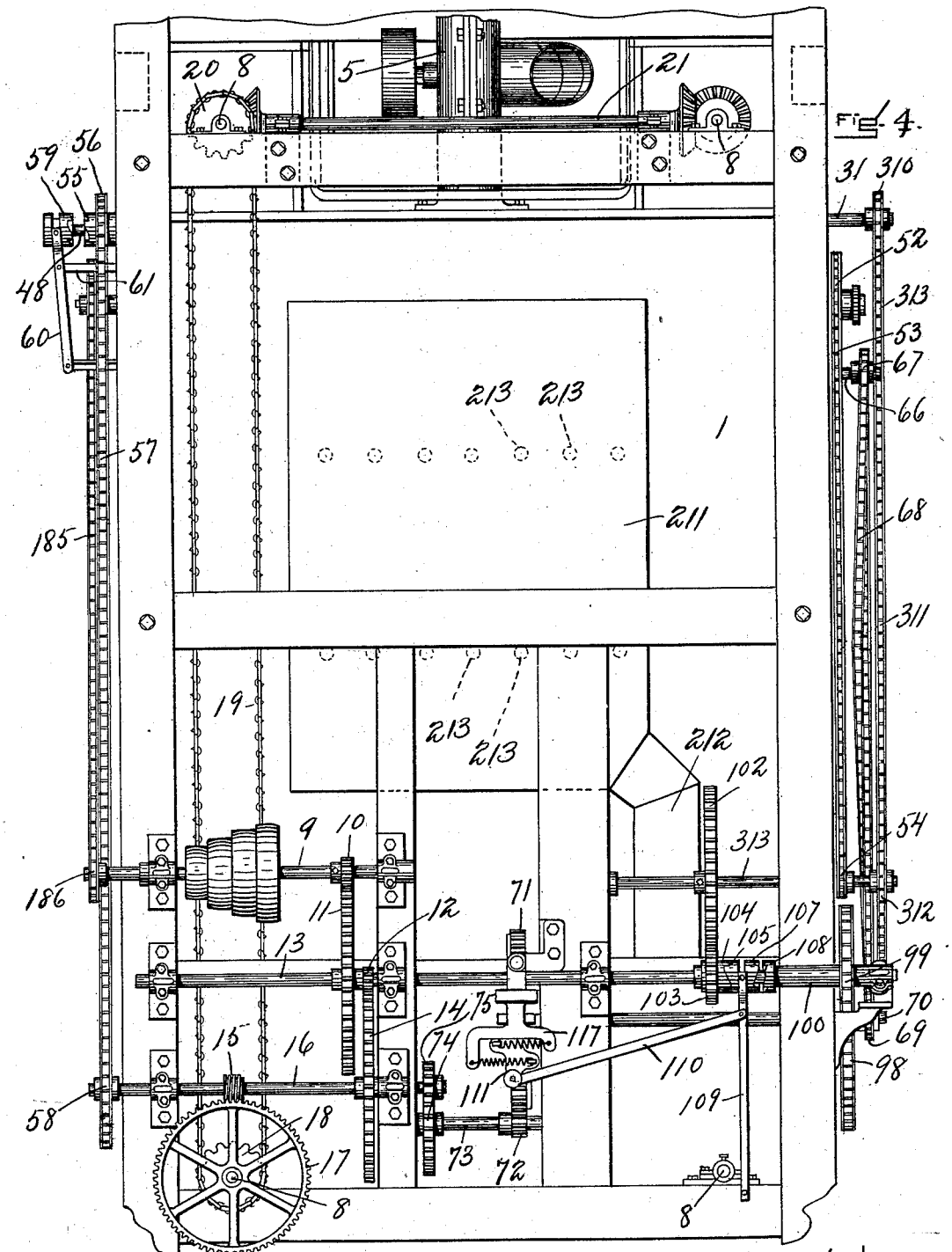
Figure 5:
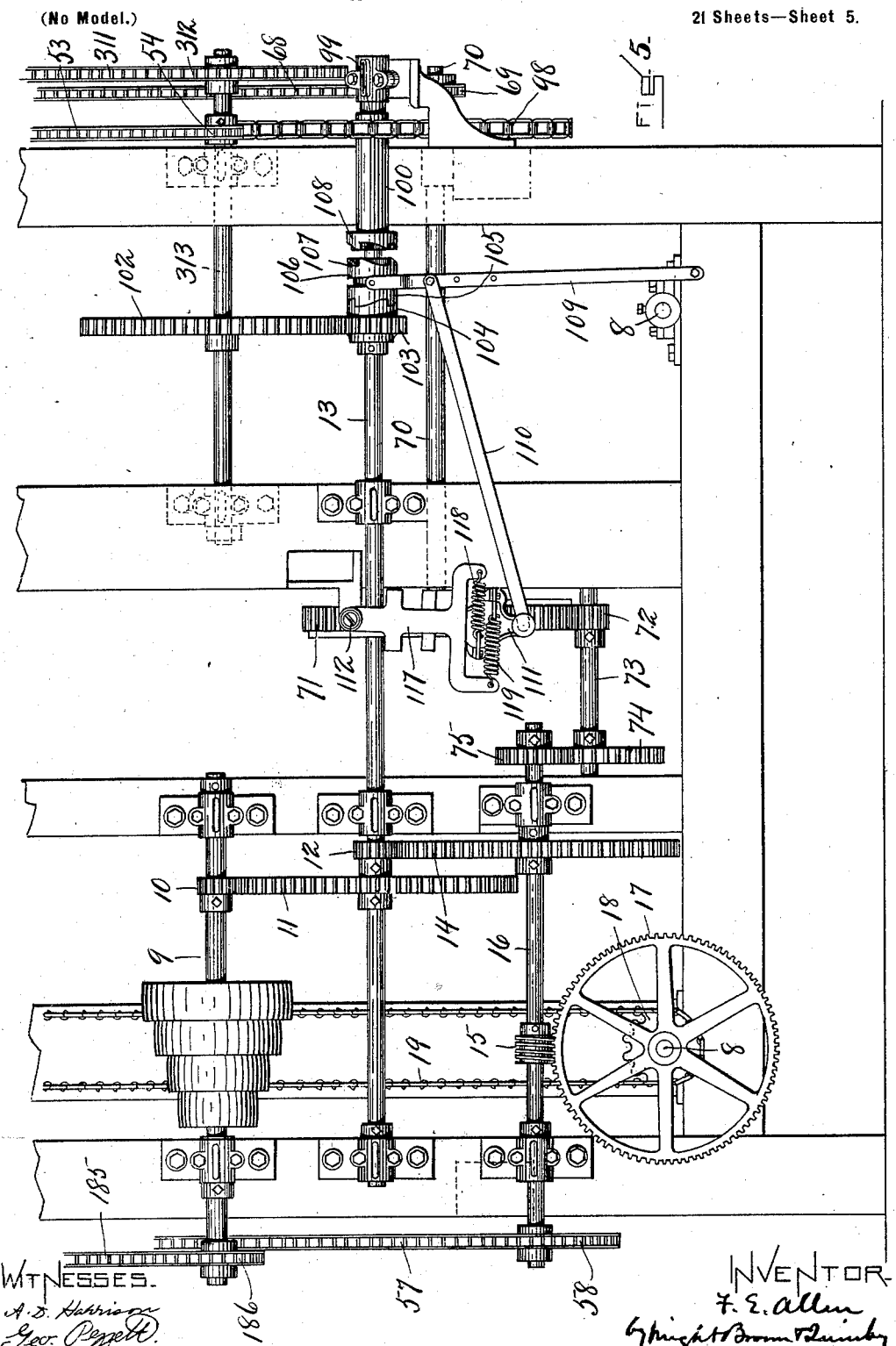
Figure 6:
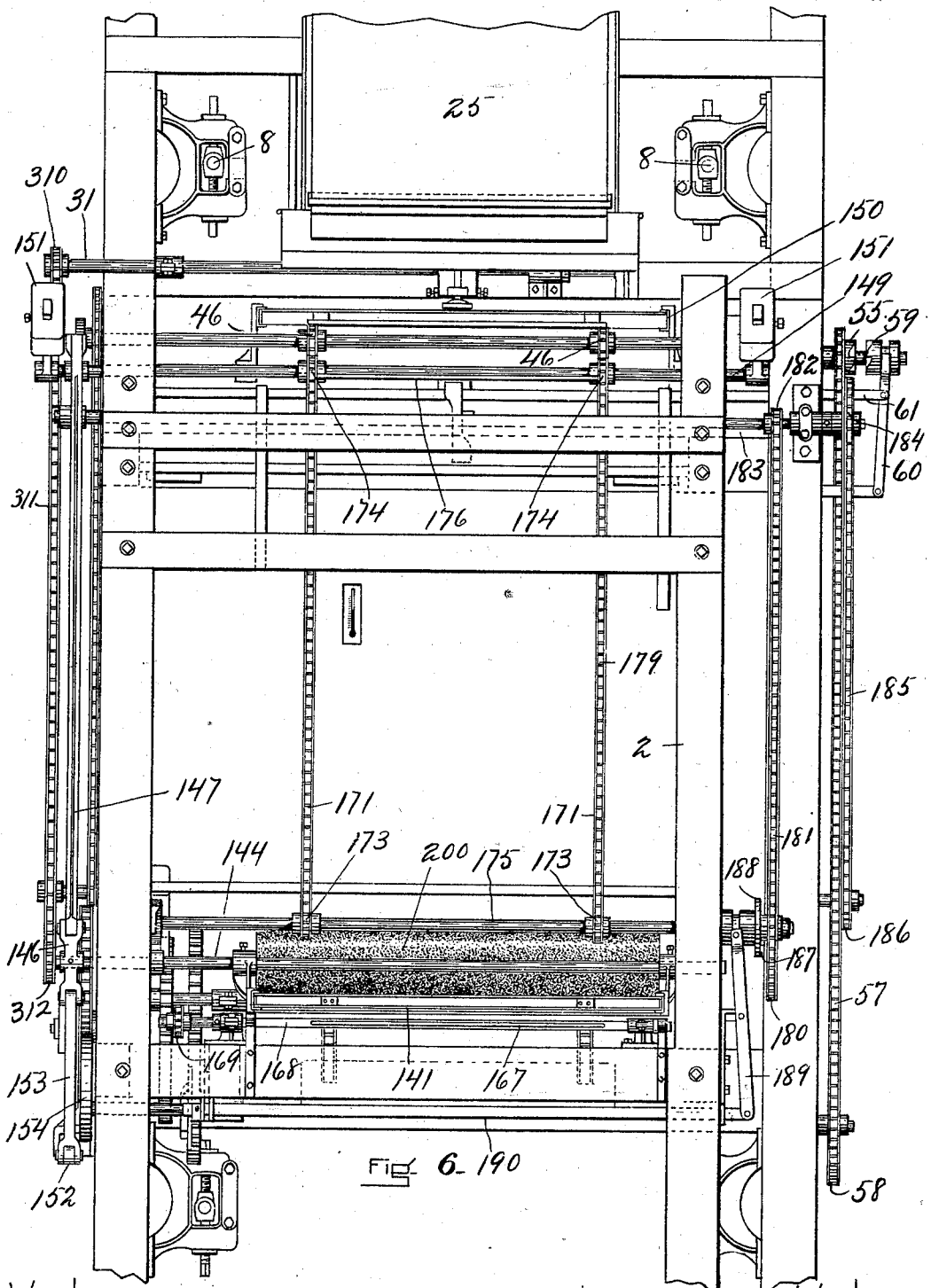

Of the accompanying drawings, forming a part of this specification, Figure 1 represents a perspective view of a drying apparatus constructed in accordance with my invention. Fig. 2 represents a side elevation thereof. Fig. 3 represents a longitudinal vertical section. These figures are drawn to the same scale, while all of those succeeding are drawn on a larger scale. Fig. 4 represents a rear elevation. Fig. 5 represents a rear elevation of the lower part of the apparatus on a larger scale than Fig. 4. Fig. 6 represents a front elevation. Fig. 7 represents a top plan view with part of the drying-bin omitted. Fig. 8 represents a horizontal section showing the lower parts in plan. Fig. 9 represents a right-hand side elevation of the upper part of the apparatus. Fig. 10 represents a transverse vertical section of the drying-bin looking rearwardly. Fig. 10ᵃ represents a partial section on the line 10ᵃ 10ᵃ of Fig. 10. Fig. 11 represents a longitudinal vertical section of the upper part of the apparatus. Fig. 12 represents a similar section showing a different position of the parts. Fig. 13 represents a longitudinal vertical section of the lower part of the apparatus. Fig. 14 represents a similar section showing a different position of the parts. Fig. 15 represents a longitudinal vertical section of the front portion of the apparatus. Fig. 16 represents a longitudinal vertical section of the lower part of the apparatus, taken close to the left-hand side of the frame. Figs. 17 and 18 represent detail views of the parts shown in Fig. 16 to illustrate different positions of said parts. Fig. 19 represents a broken horizontal section of the lower front portion of the apparatus. Fig. 20 represents a horizontal section showing the speed-changing mechanism for the upper carrier. Fig. 21 represents a similar section showing the parts in a different position. Fig. 22 represents a transverse vertical section showing said parts. Figs. 23 and 24 represent detail longitudinal vertical sections showing said parts. Figs. 25 and 26 represent detail vertical longitudinal sections showing one end of the upper carrier, its guides, and adjacent parts. Fig. 27 represents the left-hand end of the propelling-shaft for the upper carrier. Fig. 28 represents a perspective view of the supports and actuating mechanism for the hopper and distributing-pan. Fig. 29 represents a detail rear elevation of certain clutch mechanism hereinafter referred to. Fig. 30 represents a similar view showing the parts in a different position. Fig. 31 represents a perspective view of a portion of said mechanism. Fig. 32 represents a vertical section thereof. Fig. 33 represents a side elevation of the tray-dumping member. Fig. 34 represents a similar view showing the said member in a different position. Figs. 35 to 39, inclusive, represent sections in the same general locality, showing the different positions of the tray-carrier-locking and tray-latching devices. Fig. 40 represents a detail longitudinal vertical section showing a tray-advancing device.

The same reference characters indicate the same parts in all of the figures.

The machine herein shown and described is selected by me as at present the preferred embodiment of my invention; but various changes may be made without departing from the spirit and nature of the invention. In the described embodiment I provide a closed drying bin or receptacle provided with suitable heating means and containing a pair of endless carriers, to which a continuous motion is imparted and which support a vertical stack or tier of trays, upon which the material to be dried is spread out. A hopper is provided for filling the trays, which latter are automatically kept moving in a continuous circuit, the full trays being passed one at a time into the drying-bin at the top of the descending tier, and the trays at the bottom of the tier, whose contents have been thoroughly dried, being passed out of the drying-bin one at a time and inverted or dumped to empty them of their contents and passed up to be again filled by the hopper.

Referring to the drawings, 2 represents a suitable framework, at the rear end of which is a drying bin or receptacle 1, normally kept closed, but having a door 3 on its front side, adapted to be opened to give access to the interior of the bin when desired. Inside of the bin are steam-coils 4, Figs. 3, 10, and 10ª, for heating its interior, and at the upper end is an exhaust-blower 5 for removing moisture due to evaporation and maintaining a circulation within the bin.

6 6 represent a pair of endless-chain carriers supported on eight sprocket-wheels 7 7, attached to four shafts 8 8, which are continuously rotated from a horizontal belt-shaft 9 at the back of the machine through gearing comprising a pinion 10 on shaft 9, gear 11 and pinion 12 on counter-shaft 13, gear 14 and worm 15 on counter-shaft 16, worm-gear 17 on one of the lower shafts 8, sprocket 18 on said shaft connecting by chain 19 with sprocket 20 on one of the upper shafts 8, and suitable bevel-gears and cross-shaft 21, connecting said upper shaft with the other upper shaft 8. The two facing stretches of the carriers 6 6 move downward continuously at a slow rate of speed between two vertical partitions or guides 22 22, Fig. 10, and the carriers are provided at regular intervals with lags or flanges 23 23, which form a series of horizontal shelves for supporting the edges of the drying-trays 24 24, the latter being shallow-pans with perforated or wire-grating bottoms.

The bin 1 may be of any height desired, and the stack or tier of trays will be of corresponding height. Trays freshly filled with undried material are continuously added to the upper end of the tier, and the trays at the bottom of the tier which have had their contents dried are continuously abstracted from the bottom and relieved of their contents, as hereinafter explained.

At the top of the machine is a hopper 25 for feeding the material to be dried to the trays 24, and below the delivery-orifice of said hopper is a distributing-pan 26 for distributing the material upon the trays. The hopper and pan are both mounted upon a frame 27, Fig. 28, which is journaled upon a vertical pintle 28 and is adapted to receive a horizontal vibratory movement to shake down the contents of the hopper. The distributing-pan 26 is mounted upon a pair of arms 29, secured to a rock-shaft 30, which is journaled in the frame 27, said rock-shaft being adapted to be oscillated to give the distributing-pan alone a vertical vibratory movement in addition to its horizontal vibratory movement. The mechanism for imparting this vertical vibratory movement to the distributing-pan comprises a rotary shaft 31, having a star-wheel cam 32, which operates upon the end of an arm 33, secured to the rock-shaft 30, said arm being normally elevated by means of a spring 34. To impart the horizontal vibratory movement to the hopper and pan, there is provided a cam 35 on shaft 31, acting on the lower end of a pivoted arm 36, connected by chain 37 with a collar 38, loosely surrounding the rock-shaft 30, the pulling movement of the chain being in a direction tangential to the pintle 28 and exerted against the tension of a retracting-spring 205. The rapidity of discharge of the material from the end of the pan 26 is regulated by varying the inclination of the pan, this being accomplished by mounting an arm 39 on the rock-shaft 30, at the end of which arm is a pivoted collar 40, through which screws a spindle 41, having secured to it on opposite sides a collar 42, pivoted to a lug on the frame 27, a hand-wheel 43, and an adjustable collar 44. During the vertical vibration of the distributing-pan 26 the spindle 41 slides through the collar 42, and the hub of the hand-wheel 43 striking against the said collar limits the extent of the upward movement of the said spindle, and hence determines the amount of downward inclination of the distributing-pan. This amount may be varied by adjusting the spindle. The shaft 31 is rotated by means of a sprocket-wheel 310 on its end, connected by a chain 311 with a sprocket-wheel 312 on a shaft 313 at the back of the machine, said shaft 313 being rotated intermittently, as hereinafter set forth.

Below the distributing-pan 26 is an endless carrier 49, consisting of a pair of chains 45, mounted upon four sprocket-wheels 46 46, and having a cross-bar or lag 47, which is adapted to engage the edges of the trays 24 and advance them beneath the hopper and into the drying-bin. The two sprocket-wheels 46 at the rear or inner end of the carrier 49 are secured to a shaft 48, which is rotated intermittently and at two different speeds, a slow speed being given to it while a tray is being filled in passing beneath the distributing-pan 26, as represented in Fig. 11, and a faster speed to advance the tray into the drying-bin after being filled. To this end the shaft 48 has two clutches on its respective ends. The left-hand clutch transmits the slow motion and consists of a ratchet 50, Fig. 27, secured to the shaft 48, and a pawl 51, secured to a sprocket-wheel 52, which is connected by a chain 53 with a sprocket-wheel 54 on the intermittently-driven shaft 313. The fast-motion clutch on the right-hand end of the shaft is a claw-clutch having a member 55 loose on the shaft 48 and provided with a sprocket-wheel 56, connected by a chain 57 with a larger sprocket-wheel 58 on the worm-shaft 16, the other member 59 of the clutch being splined to the shaft 48 and movable longitudinally thereof under the influence of a shipping-lever 60. The latter is connected to a horizontal rod 61, (see Figs. 20 to 24,) mounted in suitable bearings and adapted to slide transversely of the machine. Said rod is connected by two springs 62 63 with the end of a horizontal swinging lever 64, controlled by a cam 65 on a shaft 66. The latter is provided on its end with a sprocket-wheel 67, connected by a chain 68 with a sprocket-wheel 69 on a continuously-rotated shaft 70 at the rear of the machine, said shaft 70 having a gear 71, connected by a pinion 72, counter-shaft 73, and gears 74 75 with worm-shaft 16, the shaft 66 being thereby continuously rotated. The short arm of lever 64 has a fork 76, adapted to be engaged by one or the other of two projections 77 78 on the cam, whereby the lever is swung to one side or the other of a middle position, thereby putting under stretching tension one or the other of the springs 62 63, connected to its long arm. Between the projections 77 78 the periphery of the cam has a narrow part, which permits the lever 64 to assume a middle position. During the slow feed of the carrier 45, which is accomplished by the sprocket 52 and the pawl-and-ratchet clutch acting on the shaft 48, the lever 64 has a middle position. Just before the quick feed is to be thrown in to advance the filled tray into the drying-bin the projection 78 on cam 65 throws the long end of lever 64 to the left, as shown in Fig. 20, and puts the spring 63 under tension, but the rod 61 is not immediately allowed to slide to the left in obedience of this tension, but is restrained by the engagement of the rear end of a pivoted locking lever or latch 79 with a lug 80, attached to the sliding rod, said latch being normally moved into locking position by a spring 81. Shortly afterward an arm 82, fixed to the shaft 66, comes into engagement with a projection 83 on the latch-lever 79 and oscillates said latch-lever so as to release the sliding rod 61 and permit it to move the clutch parts 55 59 into engagement, as shown in Fig. 20, and start the quick feed for the carrier. By this arrangement the transition from slow feed to quick feed and the advance of the filled tray into the drying-bin are accurately timed with relation to the movements of the other parts of the machine, and particularly with relation to the position of the shelves 23 on the drying-bin carrier 6 6. During the quick feed the ratchet 50 rotates underneath the pawl 51, and soon after the commencement of the quick feed the sprocket 52 is brought to rest by mechanism hereinafter described. Just before the feed of the carrier 45 is to be stopped the long arm of lever 64 is thrown to the right, as shown in Fig. 21, to put the spring 62 under tension, but the sliding rod 61 is momentarily restrained and prevented from moving to the right to throw out the clutch 55 59 by the engagement of a second pivoted trip or latch lever 84 with a lug 85 on the sliding rod, said latch-lever being normally held in position to engage the lug by a spring 86 and being finally depressed to release the sliding rod and throw out the clutch 55 59 by the action of a dog or lag 87, affixed to the carrier 45 on the rear end of said lever 84. By the time that the dog 87 acts the lag 47 on the carrier 45 has attained the proper position to engage the next succeeding tray and feed it beneath the hopper.

88 89 are pivoted flaps or doors arranged in the front wall of the bin above and below the carrier 45, the former swinging inwardly to permit the passage of the trays into the hopper and the latter swinging outwardly to permit the outward passage of the dog 87 and lag 47, the flaps at other times assuming a closed position to prevent the escape of heat from the drying-bin.

In the lower part of the drying-bin 1 and projecting through its front wall is a carrier 90, Figs. 13, 14, consisting of two chains 91 91, mounted upon two pairs of sprocket-wheels 92 93, Figs. 3 and 10, connected across by a leg 94, adapted to engage the rear edge of the lowermost tray in the stack within the drying-bin and pass said tray out of the drying-bin onto a dumping-frame 95, which is then inverted to discharge the dried contents of the tray into a suitable receptacle located below said dumping-frame. The two forward sprocket-wheels 93 are mounted upon a shaft 96, having a large sprocket-wheel 97 on its end, connected by a chain 98 with a smaller sprocket-wheel 99, mounted upon a sleeve 100, which loosely surrounds the continuously-running shaft 13. In the front wall of the drying-bin 1 is a hinged gravity flap or door 101, normally closing its opening, but permitting the outward passage of the trays.

I will now describe the mechanism whereby the upper and lower carriers 45 90 are thrown alternately into and out of gear with the shaft 13, said mechanism being mainly shown in Figs. 4, 5 and Figs. 29 to 32. The counter-shaft 313, from which the slow-motion feed-sprocket 52 for the upper carrier and also the shaft 31 for vibrating the hopper and distributing-pan are rotated, is provided with a gear 102, engaging a pinion 103, loosely mounted on shaft 13 and having one half 104 of a claw-clutch, of which the other half 105 is mounted upon a clutch member 106, movable longitudinally of shaft 13 and splined to rotate with said shaft. The opposite end of clutch member 106 has one half 107 of a second claw-clutch, of which the other half 108 is mounted on the end of sleeve 100. A pivoted operating-lever 109, having a forked end engaging a groove in member 106, is connected by a link 110 with a swinging lever 111, mounted upon a pivot-stud 112 at its upper end. The toothed gear 71, mounted on the continuously-rotating shaft 70, is also a cam member, having cam projections 113 114 on its rim adapted to engage the arms 115 115 of a fork on lever 111, embracing the cam member and adapted also to engage the arms 116 116 of a fork on a second lever 117, pivoted on the stud 112. Two oppositely-operating springs 118 119 connect the levers 111 117. The effect of this mechanism is to throw the clutch member 106 in one direction or the other, and thus throw in one or the other of the clutches. Supposing that the clutch 107 108 is thrown in, as represented in Fig. 29, and is operating the lower carrier 90 and other parts actuated by the chain 98, the cam projection 114 first comes in engagement with the left-hand arm 116 of lever 117, as illustrated in Fig. 32, and throws said lever over to the left, as shown in Fig. 29, putting the spring 119 under tension. Immediately thereafter the right-hand arm 115 of lever 111 slips over the abrupt rear end of cam projection 113 and permits lever 111 to swing to the left, as shown in Fig. 30, thus throwing out clutch 107 108 and throwing in clutch 104 105. The mechanism described effects a very quick throwing in and out of the clutches and an accurate timing of these occurrences.

On shaft 96 (see Figs. 16 to 18) is a pinion 120, meshing with a large gear 121 on a counter-shaft 122, said counter-shaft having also affixed to it a mutilated gear 123, a second mutilated gear 124 of slightly smaller diameter, and a sprocket-wheel 125, Fig. 8, located between the two mutilated gears. As seen in Fig. 17, the mutilated gear 124 has a long convex dwell 126 or portion without teeth and a short toothed portion 127. 128 is a mutilated gear member or pinion fixed to the trunnion 129 of dumping-frame 95 and having two toothed portions 130 130 of equal length with the toothed portion 127 and separated by two short concave dwells 131 131, adapted to fit against the dwell 126. The dumping-frame 95 is thereby caused to make a half-rotation in each complete rotation of the mutilated gear 124. This rotation of the dumping-frame occurs immediately after a tray has been brought from the drying-bin and advanced onto the frame, as seen in Fig. 13. The sides of the frame are suitably flanged to constitute guides, which engage the edges of the tray both above and below the same. The front end of the tray, which has been placed in the dumping-frame, is prevented from falling out of the end of said frame when the latter is being inverted, as shown in Fig. 17, by the action of a small dog 132, (see Figs. 33 to 39,) mounted upon a rod 133, which runs along one side of the frame 95, and adapted to take over the end of the tray 24, as shown in Fig. 38. The rod 133 is normally rotated to move the dog 132 into tray-engaging position by the spring 134, Fig. 33. As the tray finally reaches its inverted position the dog 132, which is now at the rear end of the tray, comes into engagement with a fixed cam member 135, which oscillates the dog into a position parallel to the direction of movement of the dumping-frame, as shown in Figs. 36 and 38, in order to permit the next succeeding tray to enter the dumping-frame. A similar dog 132, rod 133, spring 134, and cam 135 are provided for the opposite end of the dumping-frame. The rear end of the tray which is being inverted in the dumping-frame projects slightly beyond the rear end of the frame, as seen in Fig. 17, so that the dog 132 at that end is prevented from assuming its crosswise position when it passes from engagement with the cam member 135. There is further provided for extra security in holding the frame 95 in its horizontal or stationary position a pivoted latch 136, actuated by a spring 137 and adapted to snap into engagement with either one of two similar lugs 138 on the side of the frame as the latter comes into horizontal position. Just before the gear 127 comes into the position to invert the dumping-frame a latch-releasing arm 139, fixed to the shaft 122, throws out the latch 136, as shown in Fig. 37, and permits the frame 95 to rotate.

Beyond the dumping-frame is a pair of horizontal stationary guides 140 of sufficient length to accommodate a single tray. After the tray in the dumping-frame has been inverted to discharge its dried contents it remains stationary for a certain time while a tray on the upper carrier 45 is being filled by the hopper and passed into the drying-bin. The lower carrier 90 also remains stationary during the filling operation and starts to move when the upper carrier has stopped. The tray which is being passed out of the drying-bin from the lower end of the stack engages the rear edge of the inverted tray in the dumping-frame 95 and pushes said tray out of the frame onto the guides 140. The said tray, advancing into the guides 140, in like manner pushes the tray which is in said guides out of the guides and onto a frame 141, which comprises a pair of flanged guide-arms 142 142, connected by a cross-bar 143 and affixed to a rock-shaft 144. Said rock-shaft is provided with suitable weights 145 to counterbalance the weight of the frame and tray, and on the left-hand end of the rock-shaft is mounted a lever 146, connected by a link 147 with an arm 148 on a rock-shaft 149, said rock-shaft having mounted on it a frame 150, similar to the frame 141, and counterbalanced by weights 151. The lower frame 141 is mounted to swing forwardly into a horizontal position, Fig. 13, or upwardly into a vertical position, Fig. 15, and the upper frame 150 is mounted to swing rearwardly into a horizontal position, Fig. 3, or upwardly into a vertical position, Fig. 15. The two frames are so connected that one moves into a horizontal position as the other moves into a horizontal position, and vice versa. They are operated as follows:

152 is a lever pivoted on the left-hand side of the machine and connected at one end by a link 153 with the lever 146 and at its opposite end having a roll engaging the groove of a cam 154, mounted upon a short countershaft 155. Said shaft 155 is provided with a sprocket-wheel 156, connected by chain 157 with sprocket-wheel 158 on a short countershaft 159, having a mutilated gear 160, engaged by the mutilated gear 123. One half of the periphery of gear 123 is toothed at 161, and the other half is a convex dwell 162.

The mutilated gear 160 is provided with a toothed portion 163 of a length equal to the toothed portion of gear 123 and is provided with a short concave dwell 164, fitting the dwell 162 of gear 123. The gear 160 makes one revolution during a half revolution of the gear 123 and is arrested or locked during the remaining half of the said revolution of gear 123. The lower frame 141 is brought into a horizontal position at an appropriate time to receive a tray coming from the guides 140. On the frame 141 near the rock-shaft 144 are located a pair of spring-catches 165, Figs. 13, 40, which bear upon the fixed guides 140 on the main frame when the pivoted frame 141 is brought into horizontal position in order to permit the tray coming from the guides to enter the pivoted frame. When the frame 141 swings upwardly, these catches are released and then act to prevent the tray in said frame from slipping out of the frame.

167, Fig. 40, is a short arm elongated transversely of the machine and mounted upon a shaft 168, which is provided with a sprocket-wheel 169, connected by chain 170 with the sprocket-wheel 125 on shaft 122. After the filled tray has been advanced into the dumping-frame 95 and before the latter starts to rotate this arm 167 comes into engagement with the inner side of the forward rim of the inverted tray in guides 140 and advances it a slight distance, in order to clear the rear end of the tray in guides 140 from the projecting rear end of tray in dumping-frame 95 (shown in Fig. 17) when the latter shall have become inverted.

The relative timing of the operations above mentioned is as follows: The dumping-frame 95 begins to turn at the same time that the lower tray in the drying-bin starts out of the bin, and the parts shortly afterward have the positions represented in Fig. 14. As the dumping-frame completes its half-revolution and becomes locked the tray from the drying-bin still advancing under the impulse of the lag 94 on carrier 90 enters the dumping-frame and pushes out the inverted empty frame in front of it, which in turn pushes the inverted empty tray in guides 140 out of said guides into the pivoted frame 141. There is then a slight interval, during which the trays in the lower part of the machine remain stationary, after which the frame 141 begins its upward swing into vertical position. During the upward movement of the tray under the influence of the vertical carrier, which I shall next describe, and also during a portion of the return movement of frame 141 toward horizontal position the arm 167 acts, as above described, to draw the tray in guides 140 forward a slight distance. The tray which is in frame 141 being in a vertical position at the front of the machine is next engaged by a vertical carrier 179, comprising two endless chains 171 171, having cross-bars or lags 172, adapted to engage the trays and mounted upon two pairs of sprocket-wheels 173 174, which are secured to two shafts 175 176. The lower shaft is provided with a ratchet 177, Fig. 16, engaged by a stationary check-pawl 178 for preventing the reverse movement of the vertical carrier. On the right-hand end of the lower shaft 175 is loosely mounted a sprocket-wheel 180, connected by a chain 181 with a sprocket-wheel 182 on an elevated counter-shaft 183. Said shaft has a second sprocket-wheel 184, connected by chain 185 with a sprocket-wheel 186 on the belt-shaft 9. Sprocket 180 has one half 187 of a clutch, (see Fig. 19,) of which the other half 188 is splined to and movable longitudinally of the shaft 175 by means of a lever 189, actuated by a sliding rod 190. The latter is moved in a direction to throw out the clutch by means of a spring 191 and is moved in the opposite direction by engagement with a cam 192, mounted on shaft 155. Soon after the frame 141 has been brought into vertical position the cam 192 acts to throw the rod 190 toward the right, Fig. 19, which engages the parts of the clutch 187 188 and starts the vertical carrier 179 in motion. One of the lags 172 on said carrier engages the lower edge of the tray in frame 141 and carries it upwardly out of said frame and into the frame 150. The latter is provided near its rock-shaft 149 with spring-catches 193, Fig. 15, similar to those on the lower frame 141, said catches 193 engaging fixed tray-guides 194 when the frame 150 is brought into vertical position, which throws the catches out of the path of the rising tray. Just before the tray has reached its uppermost position the projection on cam 192 passes out of engagement with the end of the rod 190; but said rod is still restrained from moving to throw out the clutch 187 188 by the engagement of a pivoted lever 195 with a lug 196 on the rod 190, said lever 195 being projected by a spring 204, Fig. 16. Lever 195 is connected by a link 197 with a horizontal lever 198, having a beveled lug 199, adapted to be engaged by the lags 172 on the carrier 179. When the lag 172, which is elevating the tray, has reached the upper end of its travel, the other lag 172 engages the lug 199, oscillating the levers 198 and 195 and releasing the rod 190, thereby throwing out the clutch 187 188 and stopping the carrier in the proper position to engage the next tray. After the carrier comes to rest the upper frame 150, containing the tray, swings into a horizontal position, and at the beginning of said movement the catches 193 are released to engage the lower edge of the tray and prevent it from slipping out of the frame. After the frame 150 has reached a horizontal position, as shown in Figs. 11 and 12, the upper carrier 45 is started in motion, and its lag 47 engages the tray and advances it underneath the hopper in the manner hereinbefore described. The cycle of the machine is thus completely automatic.

Over the guides 140 is mounted a rotary brush 200, whose length is equal to the width of the trays, the shaft of said brush having a sprocket-wheel 201 connected by chain 202 with a sprocket-wheel 203 on the right-hand end of shaft 96. This brush, acting on the bottoms of the trays which are presented upwardly in the guides 140, acts to disengage from the trays any of the material which may still cling to them after they have been dumped.

The machine may be built to any height greater proportionally than that shown in the drawings by simply multiplying the units in the drying-bin carrier and in the vertical tray-carrier 179 and increasing the vertical length of the transmission-gearing and the height of the frame.

For uniformly heating and ventilating the interior of drying-bin 1 and exhausting moisture-charged air therefrom the following arrangements (shown in Figs. 3, 4, 10, 10ª, and 11) are provided: The partitions 22 22, hereinbefore mentioned, and two lower partitions 206 206, (shown in Fig. 10,) extending from front to rear of the bin, divide its interior space into a middle compartment 207, in the upper part of which the trays move and in the lower part of which are located the steam-coils 4, and two side compartments 208 208, which communicate with the upper end of the middle compartment by way of the spaces 209, through which the carriers 6 6 pass, and are also connected therewith by means of several horizontal series of holes or outlets 210 210 in the partitions 22, located at different heights. At the back of the bin is located an air box or chamber 211, connecting at its lower end by an air passage or flue 212 with the lower part of middle section 207. In the rear wall of the bin 1 are two horizontal series of holes 213 213, connecting the interior of the box 211 with the middle compartment 207 and located at different heights, the lower row of holes 213 being shown as located between the upper and lower rows of holes 210 and the upper row of holes 213 as located above the upper rows of holes 210. This arrangement may be variously modified. Its object is to distribute the air heated by the steam-coils 207 evenly throughout the stack of trays, a part of the heated air passing into the stack from the bottom and a part passing through the flue 212 into box 211 and from thence into the stack, partly through the lower row of holes 213 and partly through the upper row. The moisture-laden air from the lower trays has an opportunity to escape into the side compartments 208 through the lower rows of holes 210 without passing entirely through the stack, and that from the intermediate trays can pass out through the upper rows of holes 210, the air in the side compartments reaching the exhaust-blower 5 through the passages 209, while that from the upper part of the middle compartment is exhausted directly by the blower. There is thus effected a uniform, quick, and economical heating of the material in the drying-bin.

I claim—

1. In a drier, a drying-bin, a series of disconnected trays, tray-propelling means within the bin, devices independent of said tray-propelling means and timed therewith for automatically advancing the trays into the bin and withdrawing them therefrom, means to automatically fill the trays approaching the bin, means to automatically discharge the trays leaving the bin, and devices for automatically conducting the trays from the withdrawing and discharging devices to the filling means and advancing device.

2. In a drier, a drying-bin, a series of trays, a device for filling the trays, and means for conducting the trays at a relatively slow speed while being filled by said device, and at a relatively fast speed from said device into the drying-bin.

3. In a drier, a drying-bin, a series of trays, a device for filling the trays, a carrier for advancing the trays beneath said filling device to be filled, and from said device into the drying-bin, and means for propelling said carrier at a relatively slow speed while the tray is being filled, and at a relatively fast speed while it is being advanced into the drying-bin.

4. In a drier, a drying-bin, a series of trays, a device for filling the trays, a carrier for advancing the trays beneath said filling device to be filled, and from said device into the drying-bin, two driving mechanisms operated at different speeds, clutches for connecting said mechanisms to and disconnecting them from the carrier, and means for alternately operating said clutches.

5. In a drier, a series of trays, a carrier adapted to advance said trays, slow and fast motion carrier-propelling mechanisms, a carrier-propelling shaft, a pawl-and-ratchet clutch adapted to connect the slow-motion mechanism with the shaft, a crown toothed clutch adapted to connect the fast-motion mechanism with the shaft, and means to connect and disconnect the last said clutch.

6. In a drier, a series of trays, a carrier adapted to advance said trays, carrier-propelling mechanism, a clutch adapted to connect said mechanism to and disconnect it from the carrier, a spring adapted to throw the clutch, means to put said spring inoperatively under clutch-throwing stress prior to the throwing of the clutch, and means controlled by the position of the carrier for rendering said spring operative.

7. In a drier, a series of trays, and a tray-filling device comprising a hopper, an inclined distributing-pan below the hopper, means to vibrate the hopper and pan horizontally, and means to vibrate the pan vertically.

8. In a drier, a series of trays, and a tray-filling device comprising a hopper, an inclined distributing-pan below the hopper, means to vibrate the hopper and pan horizontally, means to vibrate the pan vertically, and means for adjusting the lower limit of inclination of the pan to vary the feed.

9. In a drier, a series of trays, a tray-filling device adapted to feed loose or broken material by vibratory agitation of the device, means to intermittently so agitate the device, and means to intermittently advance the trays beneath said device during periods coinciding with the periods of agitation of said device.

10. In a drier, a series of disconnected trays, a dumping-frame having provision for receiving a tray from either end, means to automatically propel the trays in one direction into and out of said frame, and automatic mechanism timed with the propelling means to intermittently rotate said frame a half-rotation at a time in one direction.

11. In a drier, a drying-bin, a series of trays, a dumping-frame, a tray-receiving guide beyond said frame, and a carrier adapted to directly propel the trays from the drying-bin into the dumping-frame, and from said dumping-frame into the guide through the medium of the tray thus propelled.

12. In a drier, a drying-bin, a series of trays, an invertible dumping-frame, intermittently-acting means to invert said frame, an automatic latch independent of said means for locking said frame, and intermittently-acting means for releasing said latch.

13. In a drier, a drying-bin, a series of trays, an invertible dumping-frame, automatically-projected tray-retaining means on said frame, and means actuated by the movement of said frame into tray-receiving position, for retracting said tray-retaining means.

14. In a drier, a drying-bin, a series of trays, a dumping-frame, a tray-receiving guide beyond said frame, means to propel the trays from the drying-bin into said frame, and from thence into the guide through the medium of a tray thus propelled, and means to give the tray in the guide a limited additional movement to clear it from the tray in the frame.

15. In a drier, a series of trays, tray-filling means located at an elevated level, tray-discharging means located at a lower level, means to advance the trays at the two levels, and independent means to elevate the empty trays from the discharging-level to the filling-level.

16. In a drier, a series of trays, a substantially vertical carrier for handling empty trays, means to conduct the trays horizontally toward said carrier, and a swinging tray-frame movable into a substantially horizontal position to receive the trays and into a substantially vertical position to deliver them to the carrier.

17. In a drier, a series of trays, a substantially vertical carrier for handling empty trays, means to conduct the trays horizontally away from said carrier, and a swinging tray-frame movable into a substantially vertical position to receive the trays from the carrier, and into a substantially horizontal position to deliver them to said conducting means.

18. In a drier, a series of trays, a substantially vertical carrier for handling empty trays, and swinging frames at the upper and lower ends of said carrier for delivering the trays to and receiving them from the carrier and changing their posture.

19. In a drier, a series of trays, a substantially vertical carrier for handling empty trays, swinging frames at the upper and lower ends of said carrier for delivering the trays to and receiving them from the carrier and changing their posture, and a connection between said frames whereby they are swung in unison.

20. In a drier, a series of trays, a substantially vertical carrier for handling empty trays, a swinging tray-frame coöperating with said carrier, and movable from a tray-receiving position to a tray-delivering position, automatically-projected tray-retaining means on said frame, and means actuated by the movement of the frame into tray-receiving position, for retracting said tray-retaining means.

21. In a drier, a series of trays having perforated bottoms, means to invert said trays for the purpose of discharging their contents, and a brush arranged to act through the bottoms of the discharged trays to clear them of clinging material.

22. In a drier, means to support a series of trays in a vertical stack, means to cause an endless downward progression of the stack, and a drying-bin having a stack-compartment inclosing the stack, dry-air inlets to said compartment located at different levels, moist-air outlets therefrom located at different levels and alternating with the inlets, and means to supply heated air simultaneously to the different inlets.

23. In a drier, a drying-bin, means to support and propel a series of trays in the form of a vertical stack in said bin, a middle stack compartment and two side compartments in said bin, passages connecting said middle and side compartments at different vertical localities, means to heat the lower part of the middle compartment, means to exhaust the upper part of said compartment, and a distributing-chamber connecting with the lower and intermediate parts of said middle compartment.

In testimony whereof I have affixed my signature in presence of two witnesses.

FREDERICK E. ALLEN.

Witnesses:
C. F. BROWN,
R. M. PIERSON.